(12) United States Patent
Le Houx et al.

(10) Patent No.: US 10,866,480 B2
(45) Date of Patent: Dec. 15, 2020

(54) HIGH PERFORMANCE PRIVACY GLAZING STRUCTURES

(71) Applicant: Cardinal IG Company, Eden Prairie, MN (US)

(72) Inventors: Nicolas Le Houx, Saint Louis Park, MN (US); Hari Atkuri, Saint Louis Park, MN (US); Andrew DeMiglio, Saint Louis Park, MN (US); Eric Bjergaard, Saint Louis Park, MN (US)

(73) Assignee: Cardinal IG Company, Eden Prairie, MN (US)

( * ) Notice: Subject to any disclaimer, the term of this patent is extended or adjusted under 35 U.S.C. 154(b) by 184 days.

(21) Appl. No.: 15/958,724

(22) Filed: Apr. 20, 2018

(65) Prior Publication Data

US 2018/0307111 A1  Oct. 25, 2018

Related U.S. Application Data

(60) Provisional application No. 62/487,791, filed on Apr. 20, 2017.

(51) Int. Cl.
*G02F 1/01* (2006.01)
*G02F 1/155* (2006.01)
(Continued)

(52) U.S. Cl.
CPC ........ *G02F 1/155* (2013.01); *B32B 17/10045* (2013.01); *B32B 17/10055* (2013.01);
(Continued)

(58) Field of Classification Search
CPC .......... G02F 1/15; G02F 1/153; G02F 1/1533; G02F 2001/1536; G02F 1/155; G02F 1/15165; G02F 2001/1552
See application file for complete search history.

(56) References Cited

U.S. PATENT DOCUMENTS 3,951,846 A  4/1976 Gavrilovic
3,953,630 A  4/1976 Roberts
(Continued)

FOREIGN PATENT DOCUMENTS

CN  201226062 Y  4/2009
CN  101775953 A  7/2010
(Continued)

OTHER PUBLICATIONS

Bortolozzo et al., Abstract of "Transmissive Liquid Crystal Light-valve for Near-Infrared Applications," Appl. Opt., 52(22), Aug. 2013, accessed on the internet at https://www.osapublishing.org/ao/abstract.cfm?uri=ao-52-22-E73, retrieved Sep. 26, 2019, 2pgs.
(Continued)

*Primary Examiner* — Joseph P Martinez
(74) *Attorney, Agent, or Firm* — Fredrikson & Byron, P.A.

(57) ABSTRACT

A privacy glazing structure may be fabricated from multiple panes of transparent material that hold an optically active material and also define a between-pane space that is separated from a surrounding environment for thermal insulating properties. The privacy glazing structure may include various functional coatings and intermediate films to enhance the performance and/or life span of the structure. For example, the privacy glazing structure may include a low emissivity coating and a laminate layer positioned between an optically active layer and an exterior environment exposed to sunlight. The low emissivity coating and laminate layer may work in combination to effectively protect the optically active layer from sunlight degradation. Additionally or alternatively, the laminate layer may impart safety and impact resistance properties to the structure.

30 Claims, 8 Drawing Sheets

(51) Int. Cl.
  *B32B 17/10* (2006.01)
  *G02F 1/1516* (2019.01)
  *E06B 9/24* (2006.01)
  *E06B 3/67* (2006.01)

(52) U.S. Cl.
  CPC .. *B32B 17/10174* (2013.01); *B32B 17/10201* (2013.01); *B32B 17/10357* (2013.01); *B32B 17/10467* (2013.01); *B32B 17/10504* (2013.01); *B32B 17/10513* (2013.01); *B32B 2307/202* (2013.01); *B32B 2307/402* (2013.01); *B32B 2307/412* (2013.01); *B32B 2315/08* (2013.01); *B32B 2329/06* (2013.01); *E06B 3/6715* (2013.01); *E06B 2009/2464* (2013.01); *G02F 1/15165* (2019.01); *G02F 2001/1552* (2013.01)

(56) References Cited

U.S. PATENT DOCUMENTS

| | | |
|---|---|---|
| 4,047,351 A | 9/1977 | Derner et al. |
| 4,150,877 A | 4/1979 | Kobale et al. |
| 4,277,294 A | 7/1981 | Orcutt |
| 4,284,677 A | 8/1981 | Herliczek |
| 4,465,340 A | 8/1984 | Suganuma |
| 4,587,784 A | 5/1986 | Chavy et al. |
| 4,614,676 A | 9/1986 | Rehfeld |
| 4,702,566 A | 10/1987 | Tukude |
| 4,749,261 A | 6/1988 | McLaughlin et al. |
| 4,932,608 A | 6/1990 | Heidish et al. |
| 4,958,917 A | 9/1990 | Hashimoto et al. |
| 5,076,673 A | 12/1991 | Lynam et al. |
| 5,103,336 A | 4/1992 | Sieloff |
| 5,111,329 A | 5/1992 | Gajewski et al. |
| 5,111,629 A | 5/1992 | Baughman et al. |
| 5,142,644 A | 8/1992 | Vansteenkiste et al. |
| 5,151,824 A | 9/1992 | O'Farrell |
| 5,154,953 A | 10/1992 | de Moncuit et al. |
| 5,164,853 A | 11/1992 | Shimazaki |
| 5,168,387 A | 12/1992 | Asakura et al. |
| 5,197,242 A | 3/1993 | Baughman et al. |
| 5,202,787 A | 4/1993 | Byker et al. |
| 5,239,406 A | 8/1993 | Lynam |
| 5,244,557 A | 9/1993 | Defendini et al. |
| 5,408,353 A | 4/1995 | Nichols et al. |
| 5,589,958 A | 12/1996 | Lieb |
| 5,643,644 A | 7/1997 | Demars |
| 5,668,663 A | 9/1997 | Varaprasad et al. |
| 5,766,755 A | 6/1998 | Chaussade et al. |
| 5,796,452 A | 8/1998 | Pierson |
| 5,855,638 A | 1/1999 | Demars |
| 5,889,608 A | 3/1999 | Buffat et al. |
| 6,001,487 A | 12/1999 | Ladang et al. |
| 6,055,088 A | 4/2000 | Fix et al. |
| 6,061,105 A | 5/2000 | Nakagawa |
| 6,064,509 A | 5/2000 | Tonar et al. |
| 6,143,209 A | 11/2000 | Lynam |
| 6,261,652 B1 | 7/2001 | Poix et al. |
| 6,280,041 B1 | 8/2001 | Unger et al. |
| 6,297,900 B1 | 10/2001 | Tulloch et al. |
| 6,317,248 B1 | 11/2001 | Agrawal et al. |
| 6,340,963 B1 | 1/2002 | Kouichi et al. |
| 6,366,391 B1 | 4/2002 | Hurtz |
| 6,373,618 B1 | 4/2002 | Agrawal et al. |
| 6,407,847 B1 | 6/2002 | Poll et al. |
| 6,466,298 B1 | 10/2002 | Fix et al. |
| 6,486,928 B1 | 11/2002 | Lin et al. |
| 6,567,708 B1 | 5/2003 | Bechtel et al. |
| 6,589,613 B1 | 7/2003 | Kunert |
| 6,594,067 B2 | 7/2003 | Poll et al. |
| 6,621,534 B2 | 9/2003 | Lin et al. |
| 6,639,708 B2 | 10/2003 | Elkadi et al. |
| 6,643,050 B2 | 11/2003 | Rukavina et al. |
| 6,671,008 B1 | 12/2003 | Li et al. |
| 6,671,080 B2 | 12/2003 | Poll et al. |
| 6,795,226 B2 | 9/2004 | Agrawal et al. |
| 6,819,467 B2 | 11/2004 | Lynam |
| 6,829,074 B2 | 12/2004 | Terada et al. |
| 6,829,511 B2 | 12/2004 | Bechtel et al. |
| 6,842,276 B2 | 1/2005 | Poll et al. |
| 6,950,221 B1 | 9/2005 | Terada et al. |
| 7,002,720 B2 | 2/2006 | Beteille et al. |
| 7,009,665 B2 | 3/2006 | Li et al. |
| 7,023,600 B2 | 4/2006 | Mallya et al. |
| 7,033,655 B2 | 4/2006 | Beteille et al. |
| 7,081,929 B2 | 7/2006 | Furuki et al. |
| 7,085,609 B2 | 8/2006 | Bechtel et al. |
| 7,173,750 B2 | 2/2007 | Rukavina |
| 7,230,748 B2 | 6/2007 | Giron et al. |
| 7,300,166 B2 | 11/2007 | Agrawal et al. |
| 7,423,664 B2 | 9/2008 | Ukawa |
| 7,502,156 B2 | 3/2009 | Tonar et al. |
| 7,505,188 B2 | 3/2009 | Niiyama et al. |
| 7,525,714 B2 | 4/2009 | Poll et al. |
| 7,542,809 B2 | 6/2009 | Bechtel et al. |
| 7,671,948 B2 | 3/2010 | Ninomiya |
| 7,719,751 B2 | 5/2010 | Egerton et al. |
| 7,738,155 B2 | 6/2010 | Agrawal et al. |
| 7,746,534 B2 | 6/2010 | Tonar et al. |
| 7,817,327 B2 | 10/2010 | Derda |
| 7,822,490 B2 | 10/2010 | Bechtel et al. |
| 7,872,791 B2 | 1/2011 | Karmhag et al. |
| 7,876,400 B2 | 1/2011 | Baliga et al. |
| 7,906,203 B2 | 3/2011 | Hartig |
| 7,960,854 B2 | 6/2011 | Paulus et al. |
| 7,990,603 B2 | 8/2011 | Ash et al. |
| 8,102,478 B2 | 1/2012 | Xue |
| 8,164,818 B2 | 4/2012 | Collins et al. |
| 8,169,587 B2 | 5/2012 | Bolton |
| 8,187,682 B2 | 5/2012 | Albrecht et al. |
| 8,189,254 B2 | 5/2012 | Voss et al. |
| 8,199,264 B2 | 6/2012 | Veerasamy |
| 8,213,074 B1 | 7/2012 | Shrivastava et al. |
| 8,218,224 B2 | 7/2012 | Kwak et al. |
| 8,219,217 B2 | 7/2012 | Bechtel et al. |
| 8,263,228 B2 | 9/2012 | Torr |
| 8,289,609 B2 | 10/2012 | Lamine et al. |
| 8,343,571 B2 | 1/2013 | Werners et al. |
| 8,355,112 B2 | 1/2013 | Bolton |
| 8,482,838 B2 | 7/2013 | Sbar et al. |
| 8,547,624 B2 | 10/2013 | Ash et al. |
| 8,551,603 B2 | 10/2013 | Thompson |
| 8,610,992 B2 | 12/2013 | Varaprasad et al. |
| 8,619,204 B2 | 12/2013 | Saitoh et al. |
| 8,643,933 B2 | 2/2014 | Brown |
| 8,711,465 B2 | 4/2014 | Bhatnagar et al. |
| 8,810,889 B2 | 8/2014 | Brown |
| 8,869,493 B2 | 10/2014 | Chubb et al. |
| 8,913,215 B2 | 12/2014 | Yang et al. |
| 8,941,788 B2 | 1/2015 | Brecht et al. |
| 8,970,810 B2 | 3/2015 | Bowser et al. |
| 8,995,039 B2 | 3/2015 | Bartug et al. |
| 9,019,588 B2 | 4/2015 | Brown et al. |
| 9,036,242 B2 | 5/2015 | Bergh et al. |
| 9,091,868 B2 | 7/2015 | Bergh et al. |
| 9,097,842 B2 | 8/2015 | Van Nutt et al. |
| 9,102,124 B2 | 8/2015 | Collins et al. |
| 9,128,346 B2 | 9/2015 | Shrivastava et al. |
| 9,158,173 B2 | 10/2015 | Bhatnagar et al. |
| 9,176,357 B2 | 11/2015 | Lam et al. |
| 9,193,135 B2 | 11/2015 | Boote et al. |
| 9,316,883 B2 | 4/2016 | Sbar et al. |
| 9,333,728 B2 | 5/2016 | Veerasamy |
| 9,341,015 B2 | 5/2016 | Fernando et al. |
| 9,341,909 B2 | 5/2016 | Egerton et al. |
| 9,389,454 B2 | 7/2016 | Yamaguchi et al. |
| 9,400,411 B2 | 7/2016 | Poix et al. |
| 9,436,054 B2 | 9/2016 | Brown et al. |
| 9,436,055 B2 | 9/2016 | Shrivastava et al. |
| 9,442,341 B2 | 9/2016 | Shrivastava et al. |
| 9,477,130 B2 | 10/2016 | Dubrenat et al. |
| 9,494,717 B2 | 11/2016 | Reymond et al. |
| 9,550,457 B2 | 1/2017 | Green et al. |

(56) References Cited

U.S. PATENT DOCUMENTS

| | | | |
|---|---|---|---|
| 9,568,799 B2 | 2/2017 | Lam et al. |
| 9,581,877 B2 | 2/2017 | Bass et al. |
| 9,606,411 B2 | 3/2017 | Bergh et al. |
| 9,606,412 B2 | 3/2017 | Geerlings et al. |
| 9,618,819 B2 | 4/2017 | Egerton et al. |
| 9,618,820 B2 | 4/2017 | Conklin et al. |
| 9,625,783 B2 | 4/2017 | Bjornard et al. |
| 9,664,976 B2 | 5/2017 | Rozbicki |
| 9,690,162 B2 | 6/2017 | Wilbur et al. |
| 9,726,925 B2 | 8/2017 | Relot et al. |
| 9,766,496 B2 | 9/2017 | Cammenga et al. |
| 9,810,963 B2 | 11/2017 | Gauthier et al. |
| 9,829,763 B2 | 11/2017 | Friedman et al. |
| 9,857,657 B2 | 1/2018 | Ash et al. |
| 9,891,454 B2 | 2/2018 | Zhang et al. |
| 9,927,609 B2 | 3/2018 | Cammenga et al. |
| 9,939,702 B2 | 4/2018 | Bjornard |
| 9,952,481 B2 | 4/2018 | Rozbicki et al. |
| 9,958,750 B2 | 5/2018 | Parker et al. |
| 9,958,751 B2 | 5/2018 | Bergh et al. |
| 9,963,383 B2 | 5/2018 | Veerasamy |
| 9,971,194 B2 | 5/2018 | Brecht et al. |
| 9,989,822 B2 | 6/2018 | Galstian |
| 2004/0233379 A1 | 11/2004 | Kinoshita et al. |
| 2005/0002081 A1 | 1/2005 | Beteille et al. |
| 2005/0132558 A1 | 6/2005 | Hennessy et al. |
| 2005/0233125 A1 | 10/2005 | Anderson et al. |
| 2008/0089073 A1 | 4/2008 | Hikmet |
| 2008/0317977 A1 | 12/2008 | Wu |
| 2009/0246426 A1 | 10/2009 | Wu |
| 2009/0279004 A1 | 11/2009 | Greenall et al. |
| 2009/0303565 A1 | 12/2009 | Karmhag et al. |
| 2010/0028585 A1 | 2/2010 | Shimatani |
| 2010/0279125 A1 | 11/2010 | Buyuktanir et al. |
| 2011/0007253 A1 | 1/2011 | Stocq |
| 2011/0181820 A1 | 7/2011 | Watanabe |
| 2012/0086904 A1 | 4/2012 | Oki et al. |
| 2012/0094118 A1 | 4/2012 | Oki et al. |
| 2012/0327499 A1 | 12/2012 | Parker et al. |
| 2013/0107563 A1 | 5/2013 | McCabe et al. |
| 2013/0265511 A1 | 10/2013 | Poix et al. |
| 2014/0020851 A1 | 1/2014 | Ouzts et al. |
| 2014/0041933 A1 | 2/2014 | Snyker et al. |
| 2014/0204294 A1 | 7/2014 | Lv |
| 2014/0211129 A1 | 7/2014 | Bowser et al. |
| 2014/0247475 A1 | 9/2014 | Parker et al. |
| 2015/0049270 A1 | 2/2015 | Zhang et al. |
| 2015/0049378 A1 | 2/2015 | Shrivastava et al. |
| 2015/0103389 A1 | 4/2015 | Klawuhn et al. |
| 2015/0116649 A1 | 4/2015 | Watanabe |
| 2015/0118869 A1 | 4/2015 | Brown et al. |
| 2015/0151613 A1 | 6/2015 | Weng |
| 2015/0219975 A1 | 8/2015 | Phillips et al. |
| 2015/0277165 A1 | 10/2015 | Burrows et al. |
| 2015/0346575 A1 | 12/2015 | Bhatnagar et al. |
| 2015/0370140 A1 | 12/2015 | Bertolini |
| 2015/0378189 A1 | 12/2015 | Kim et al. |
| 2016/0026061 A1 | 1/2016 | O'Keeffe |
| 2016/0085129 A1 | 3/2016 | Cammenga et al. |
| 2016/0085131 A1 | 3/2016 | Lam et al. |
| 2016/0096344 A1 | 4/2016 | Kurihara |
| 2016/0124284 A1 | 5/2016 | O'Keeffe |
| 2016/0138328 A1 | 5/2016 | Behmke et al. |
| 2016/0161818 A1 | 6/2016 | Gregard et al. |
| 2016/0187753 A1 | 6/2016 | Sbar et al. |
| 2016/0243773 A1 | 8/2016 | Wang |
| 2016/0312523 A1 | 10/2016 | Miyasaka et al. |
| 2016/0363831 A1 | 12/2016 | Ash et al. |
| 2016/0377951 A1 | 12/2016 | Harris |
| 2017/0028686 A1 | 2/2017 | Wilson et al. |
| 2017/0122028 A1 | 5/2017 | Suzuka et al. |
| 2017/0139302 A1 | 5/2017 | Tonar |
| 2017/0152702 A1 | 6/2017 | Chang et al. |
| 2017/0218686 A1 | 8/2017 | Galstian |
| 2017/0219908 A1 | 8/2017 | Brown et al. |
| 2017/0328121 A1 | 11/2017 | Purdy et al. |
| 2017/0371218 A1 | 12/2017 | Kailasam et al. |
| 2018/0011383 A1 | 1/2018 | Higashihara et al. |
| 2018/0088431 A1* | 3/2018 | Holt .............. G02F 1/157 |
| 2018/0095337 A1 | 4/2018 | Rozbicki et al. |
| 2018/0101080 A1 | 4/2018 | Gauthier et al. |
| 2018/0307111 A1 | 10/2018 | Le Houx et al. |
| 2019/0002328 A1* | 1/2019 | Lezzi .............. C03B 29/16 |
| 2019/0137796 A1 | 5/2019 | Bjergaard et al. |
| 2019/0137797 A1 | 5/2019 | Bjergaard et al. |

FOREIGN PATENT DOCUMENTS

| | | | |
|---|---|---|---|
| CN | 203858432 U | 10/2014 |
| CN | 105044965 A | 11/2015 |
| CN | 105334656 A | 2/2016 |
| CN | 205176432 U | 4/2016 |
| CN | 104948080 B | 6/2016 |
| CN | 205297172 U | 6/2016 |
| CN | 205558664 U | 9/2016 |
| CN | 206035269 U | 3/2017 |
| CN | 206352460 U | 7/2017 |
| CN | 107288492 A | 10/2017 |
| CN | 107327250 A | 11/2017 |
| CN | 206737720 U | 12/2017 |
| CN | 206801372 U | 12/2017 |
| CN | 206848627 U | 1/2018 |
| CN | 207004397 U | 2/2018 |
| EP | 978620 A2 | 2/2000 |
| EP | 2093051 A1 | 8/2009 |
| EP | 2256545 A1 | 12/2010 |
| EP | 2860580 A1 | 4/2015 |
| GB | 2546987 A | 8/2017 |
| JP | 62071930 A | 4/1987 |
| JP | H01202713 A | 8/1989 |
| JP | 2004182484 A | 7/2004 |
| JP | 2017068196 A | 4/2017 |
| KR | 20130037600 A | 4/2013 |
| WO | 2005084378 A2 | 9/2005 |
| WO | 2008090438 A2 | 7/2008 |
| WO | 2010100807 A1 | 9/2010 |
| WO | 2012111715 A1 | 8/2012 |
| WO | 2014032023 A1 | 2/2014 |
| WO | 2015059029 A1 | 4/2015 |
| WO | 2015100419 A1 | 7/2015 |
| WO | 2015117736 A1 | 8/2015 |
| WO | 2016008375 A1 | 1/2016 |
| WO | 2016043164 A1 | 3/2016 |
| WO | 2017008881 A1 | 1/2017 |
| WO | 2017011268 A1 | 1/2017 |
| WO | 2017183692 A1 | 10/2017 |
| WO | 2018086400 A1 | 5/2018 |

OTHER PUBLICATIONS

International Search Report and Written Opinion of the ISA/EP in PCT/US2018/028617, dated Jun. 27, 2018, 11 pgs.

* cited by examiner

HIGH PERFORMANCE PRIVACY GLAZING STRUCTURES

RELATED APPLICATIONS

This application claims priority to U.S. Application No. 62/487,791, filed Apr. 20, 2017, the entire contents of which are incorporated herein by reference.

TECHNICAL FIELD

This disclosure relates to optical structures and, more particularly, to glazing structures that include a controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

Safety, performance, and reliability are key attributes that end market consumers look for when evaluating new technology platforms, such as controllable privacy structures. This is particularly true for glazing structures with controllable optical characteristics, such as windows and doors, which are often expected to have a lifespan lasting decades. Consumers may expect that a window or door structure having controllable optical characteristics exhibits a similar lifespan and durability to a traditional window or door, notwithstanding the additional sensitive components and complexity of the controllable structure.

SUMMARY

In general, this disclosure is directed to privacy glazing structures incorporating an optically active material that provides controllable privacy. The term privacy structure includes privacy cells, privacy glazing structures, smart cells, smart glazing structure, and related devices that provide controllable optical activity and, hence, visibility through the structure. Such structures can provide switchable optical activity that provides controllable darkening, controllable light scattering, or both controllable darkening and controllable light scattering. Controllable darkening refers to the ability of the optically active material to transition between a high visible light transmission state (a bright state), a low visible light transmission dark state, and optionally intermediate states therebetween, and vice versa, by controlling an external energy source applied to the optically active material. Controllable light scattering refers to the ability of the optically active material to transition between a low visible haze state, a high visible haze state, and optionally intermediate states therebetween, and vice versa, by controlling an external energy source. Thus, reference to the terms "privacy" and "privacy state" in the present disclosure does not necessarily require complete visible obscuring through the structure (unless otherwise noted). Rather, different degrees of privacy or obscuring through the structure may be achieved depending, e.g., on the type of optically active material used and the conditions of the external energy source applied to the optically active material. Moreover, the degree of privacy provided by a product may be further impacted by the application of internal and/or external light conditions on either side of the privacy structure.

A privacy glazing structure according to the disclosure can be implemented in the form of a window, door, skylight, interior partition, or yet other structure where controllable visible transmittance is desired. In any case, the privacy glazing structure may be fabricated from multiple panes of transparent material arranged to define a between-pane space and to bound an optically active material within the sight line of the structure. The between-pane space may be evacuated and/or filled with an insulative gas to reduce heat transfer across the glazing structure. The optically active material may be controllable, for example via an electrical driver communicatively coupled to the glazing structure and optically active material therein, to provide controllable optical transmission through the structure.

As described in greater detail below, the privacy glazing structure can have a variety of different component configurations, layers, and features to enhance the safety, performance, and/or reliability of the structure through its lifespan. In some examples, the glazing structure is configured to impart safety and/or impact resistance while managing the size profile of the overall structure to a combined thickness suitable for typical residential or commercial window and/or door openings. For example, the glazing structure may include one or more laminate layers, either on the side of a between-pane space containing the optically active material and/or on the opposite side of the between-pane space to impart safety and/or impact resistance from an external force. The thickness of the one or more laminate layers and various different panes of the glazing structure may be controlled to provide necessary structural rigidity while maintaining the size profile of the structure to a suitable overall thickness.

For instance, in some examples, the optically active material is sandwiched between opposed laminate panes that are each formed of two panes of transparent material joined by a laminate layer. The sandwiched structure may therefore have four panes of transparent material separated by two laminate layers, respectively, and a layer of optically active material. One of the four panes of transparent material may form an inner surface of a between-pane space bounded by a spacer attached to a fifth pane of transparent material. The four panes of transparent material on one side of the spacer may each have a thickness less than a thickness of the fifth pane. Additionally or alternatively, the two laminate layers incorporated into the glazing structure may have asymmetrical thicknesses such that one layer is thicker than another layer. For example, the glazing structure may be configured with an outward facing laminate layer positioned closer to an exterior surface than an interior surface and an inward facing laminate layer positioned closer to the interior surface than the exterior surface, with the optically active material positioned between the two laminate layers. The outward facing laminate layer may have a thickness greater than that of the inward facing layer. Both laminate layers may block UV radiation having a tendency to degrade the optically active layer over its service life.

The asymmetrical configuration of the laminate layer thicknesses may position the thicker laminate on the side of the optically active material facing the exterior environment where UV radiation is strongest, with the thinner laminate layer facing the interior environment where UV radiation is less. This configuration may balance radiation shielding effects of the different laminate layers while controlling the size profile of the glazing structure. The laminate layers may additionally or alternatively impart shatter resistance to the pane of transparent material bounding the optically active material, allowing the glazing structure to be certified as being safety and/or impact resistant rated.

Although a privacy glazing structure according to the disclosure can have a variety of different configurations, in some example, the glazing structure includes a low emissivity coating on an interior surface of at least one of the panes facing the between-pane space. The low emissivity coating may help block wavelengths of light within the ultraviolet spectrum thereby attenuating degrading UV radiation impinging upon the optically active material. The low emissivity coating may work synergistically with the laminate layer to provide enhanced UV blocking greater than the UV blocking provided by either layer individually. Accordingly, this can provide a coordinated UV blocking arrangement that avoids the need to increase the thickness of the laminate layer for enhanced UV blocking capabilities beyond that which is acceptable for the overall thickness limitations placed on the glazing structure.

In one example, a privacy glazing structure is described that includes a first pane of transparent material, a second pane of transparent material that is generally parallel to the first pane of transparent material, and a spacer positioned between the first pane of transparent material and the second pane of transparent material to define a between-pane space. The example specifies that the spacer seals the between-pane space from gas exchange with a surrounding environment and holds the first pane of transparent material a separation distance from the second pane of transparent material. The example privacy glazing structure also includes a third pane of transparent material that is generally parallel to the first pane of transparent material and the second pane of transparent material and a fourth pane of transparent material that is generally parallel to the third pane of transparent material. The structure also includes an electrically controllable optically active material positioned between the third pane of transparent material and the fourth pane of transparent material and a laminate layer bonding the second pane of transparent material to the third pane of transparent material. The example specifies that the laminate layer provides a barrier to ultraviolet light that would otherwise impinge upon the electrically controllable optically active material. The example glazing structure also includes a low-emissivity coating on an interior surface of at least one of the first pane of transparent material and the second pane of transparent material facing the between-pane space.

In another example, a privacy glazing structure is described that includes first, second, third, fourth, and fifth panes of glass. The structure includes a spacer positioned between the first pane of glass and the second pane of glass to define a between-pane space. The spacer seals the between-pane space from gas exchange with a surrounding environment and holds the first pane of glass a separation distance from the second pane of glass. The example structure also includes a liquid crystal material positioned between the third pane of glass and the fourth pane of glass, a first laminate layer bonding the second pane of glass to the third pane of glass, and a second laminate layer bonding the fourth pane of glass to the fifth pane of glass. The example specifies that the first pane of glass is tempered glass while the second, third, fourth, and fifth panes of glass are each formed of glass that is not thermally strengthened.

The details of one or more examples are set forth in the accompanying drawings and the description below. Other features, objects, and advantages will be apparent from the description and drawings, and from the claims.

DETAILED DESCRIPTION

Figure 1:
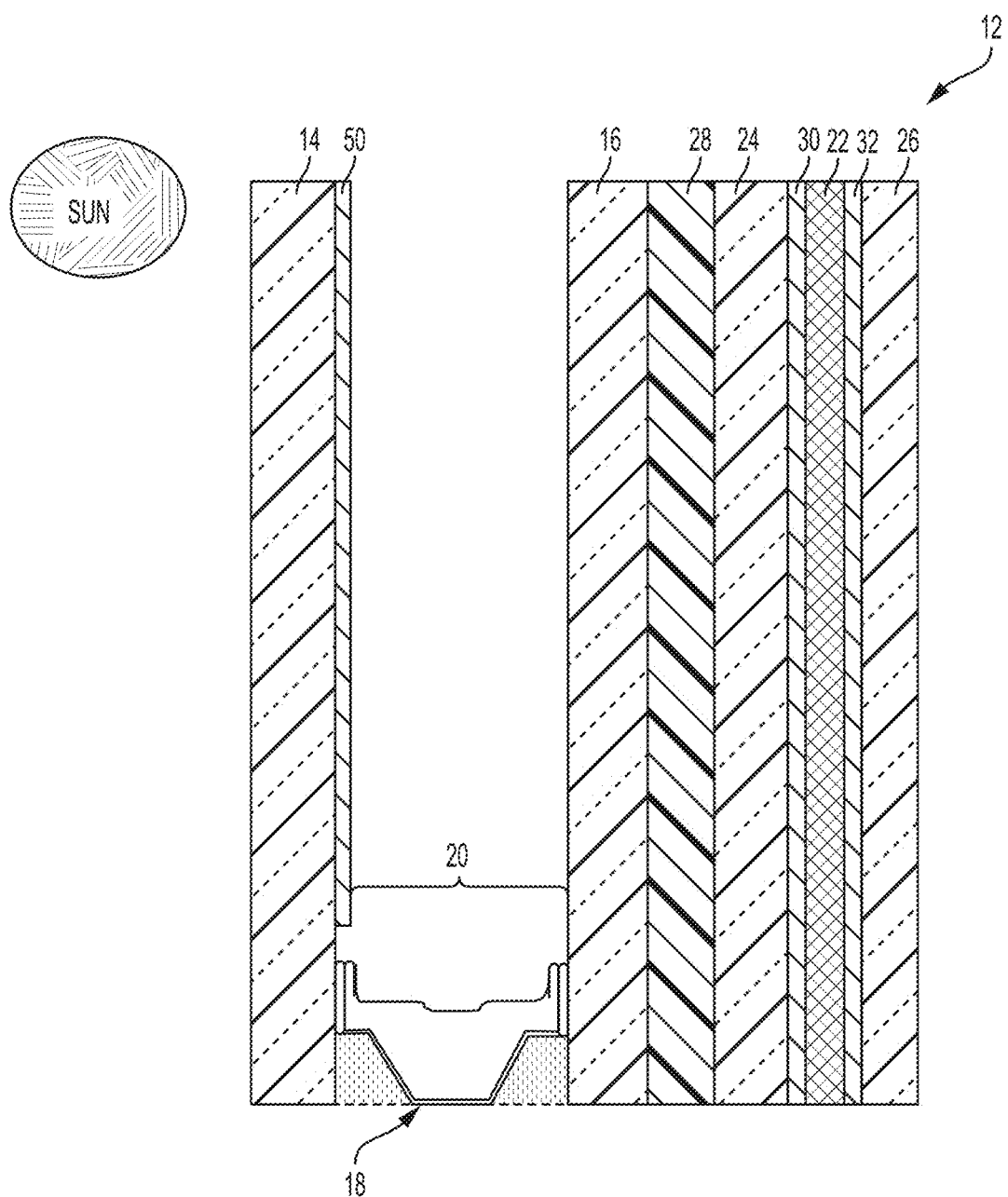
FIG. 1 is a side view illustration of an example privacy glazing structure configuration.

In general, the present disclosure relates to privacy glazing structures that contain a controllable optically active material bounded by one or more laminated substrates. Each laminated substrate may be formed from two panes of transparent material joined together with a layer of a laminate material. The laminate material may be selected according to the strength and shatter resistance it imparts to the laminated substrate, light blocking/absorption properties it imparts to the laminated substrate, and/or other performance properties. In some examples, the optically active material is bounded on one side by a laminated substrate and on an opposite side by a single pane of transparent material that is not coated on its face with a laminate layer. In other examples, the optically active material is bounded on both sides by laminated substrates. In either case, a surface of one of the panes bounding the optically active material—either directly or indirectly as part of a laminated substrate, may form an interior surface of a between-pane space. The opposite interior surface of the between-pane space may be formed by a pane joined in parallel alignment via a spacer. The pane on the opposite side of the between-pane space from that which bounds the optically active material may or may not be part of a laminated substrate. In either case, the between-pane space may be evaluated and/or filled with an insulative gas to reduce heat transfer across the between-pane space.

In some example, one or more pane surfaces of the glazing structure may carry a coating to improve the performance of the glazing structure. For example, one or both surfaces of the glazing structure may carry a low emissivity coating that reduces the amount of ultraviolet and infrared light that can pass through the pane while allowing visible light to pass through the pane substantially unchanged. The low emissivity coating may be effective, particularly in combination with one or more laminate layers of the glazing structure, to attenuate wavelengths of light that have a tendency to degrade the optically active material over time. For example, the optically active material may include polymer molecules interspersed with liquid crystals to provide controllable visible transmittances through the glazing structure. Ultraviolet light impinging upon the optically active material may have a tendency to break down the polymer molecules in the optically active material over the service life of the device unless attenuated. Accordingly, configuring the glazing structure with a coating that reflects wavelengths of light in the ultraviolet spectrum, alone or in combination with a laminate layer that may absorb light in the ultraviolet spectrum passing through the coating, can help improve the service life of the device.

Independent of the light attenuation characteristics of the glazing structure, the different panes of the glazing structure may be arranged and configured to provide safety and/or impact resistance to the structure. This may allow the privacy glazing structure to be deployed in applications subject to periodic impact forces, such as regions that experience hail, hurricane winds, or other inclement impacting weather.

FIG. 1 is a side view of an example privacy glazing structure 12 that includes a first pane of transparent material 14 spaced apart from a second pane of transparent material 16 by a spacer 18 to define a between-pane space 20. Spacer 18 may extend around the entire perimeter of privacy glazing structure 12 to hermetically seal the between-pane space 20 from gas exchange with a surrounding environment. In the illustrated example, privacy glazing structure also includes a layer of optically active material 22 positioned between a third pane of transparent material 24 and a fourth pane of transparent material 26. A laminate layer 28 bonds the second pane of transparent material 16 to the third pane of transparent material to form a composite laminate substrate composed of the second pane of transparent material 16, third pane 24, and laminate layer 28.

Privacy glazing structure 12 can utilize any suitable privacy materials for the layer of optically active material 22. Further, although optically active material 22 is generally illustrated and described as being a single layer of material, it should be appreciated that a structure in accordance with the disclosure can have one or more layers of optically active material with the same or varying thicknesses. In general, optically active material 22 is configured to provide controllable and reversible optical obscuring and lightening. Optically active material 22 can change visible transmittance in response to an energy input, such as light, heat, or electricity. For example, optically active material 22 may be an electronically controllable optically active material that changes direct visible transmittance in response to changes in electrical energy applied to the material.

In one example, optically active material 22 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 22 is formed of a liquid crystal material. Different types of liquid crystal materials that can be used as optically active material 22 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrodes. The electrodes can be formed by coating opposed substrates (e.g., third pane 24 and fourth pane 26) with a transparent conductive material. When the electric field is off, the liquid crystals may be randomly scattered. This scatters light entering the liquid crystal and diffuses the transmitted light through the material. When a certain voltage is applied between the two electrodes, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but light scattering upon application of an electric field.

In one example in which the layer of optically active material 22 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 22 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 22 may contain spacer beads (e.g., micro-spheres), for example having an average diameter ranging from 3 micrometers to 40 micrometers, to maintain separation between the third pane of transparent material 24 and the fourth pane of transparent material 26.

In another example in which the layer of optically active material 22 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 22.

Another type of material that can be used as the layer of optically active material 22 is a suspended particle material. Suspended particle materials are typically dark or opaque in a non-activated state but become transparent when a voltage is applied. Yet other examples of materials that can be used as optically active material 22 include thermochromic materials that change visible transmittance in response to changing temperature and photochromic materials that change visible transmittance in response to changing amounts of light.

Independent of the specific type of material(s) used for the layer of optically active material 22, the material can change from a light transmissive state in which privacy glazing structure 12 is intended to be transparent to a privacy state in which visibility through the insulating glazing unit is intended to be reduced. Optically active material 22 may exhibit progressively decreasing direct visible transmittance when transitioning from a maximum light transmissive state to a maximum privacy state. Similarly, optically active material 22 may exhibit progressively increasing direct visible transmittance when transitioning from a maximum privacy state to a maximum transmissive state. The speed at which optically active material 22 transitions from a generally transparent transmission state to a generally opaque privacy state may be dictated by a variety factors, including the specific type of material selected for optically active material 22, the temperature of the material, the electrical voltage applied to the material, and the like.

Depending on the type of material used for optically active material 22, the material may exhibit controllable darkening. As noted above, controllable darkening refers to the ability of the optically active material to transition between a high visible light transmission state (a bright state), a low visible light transmission dark state, and optionally intermediate states therebetween, and vice versa, by controlling an external energy source applied to the optically active material. When optically active material 22 is so configured, the visible transmittance through the cell containing optically active material 22 (e.g., in addition to other substrates and/or laminate layers bounding the optically active material and forming the cell) may be greater than 40% when optically active material 22 is transitioned to the high visible transmission state light state, such as greater than 60%. By contrast, the visible transmittance through the cell may be less than 5 percent when optically active material 22 is transitioned to the low visible light transmission dark state, such as less than 1%. Visible transmittance can be measured according to ASTM D1003-13.

Additionally or alternatively, optically active material 22 may exhibit controllable light scattering. As noted above, controllable light scattering refers to the ability of the optically active material to transition between a low visible haze state, a high visible haze state, and optionally intermediate states therebetween, and vice versa, by controlling an external energy source. When optically active material 22 is so configured, the transmission haze through the cell containing optically active material 22 may be less than 10% when optically active material 22 is transitioned to the low visible haze state, such as less than 2%. By contrast, the transmission haze through the cell may be greater than 85% when optically active material 22 is transitioned to the high visible haze state and have a clarity value below 50%, such as a transmission haze greater than 95% and a clarity value below 30%. Transmission haze can be measured according to ASTM D1003-13. Clarity can be measured using a BYK Gardener Haze-Gard meter, commercially available from BYK-GARDNER GMBH.

In applications where optically active material 22 is electrically controllable (e.g., to transition between a scattering state and a light transmitting stage), one or both of the panes of transparent material 24, 26 bounding the optically active material can carry an electrode. The electrode may be in the form of an electrically conductive coating deposited on the surface of each respective pane facing the optically active material 22. FIG. 1 illustrates third pane of transparent material 24 coated with a first electrically conductive coating 30 and fourth pane of transparent material 26 coated with a second electrically conductive coating 32. Each electrically conductive coating may be a transparent conductive oxide ("TCO") coating, such as aluminum-doped zinc oxide and/or tin-doped indium oxide. The transparent conductive oxide coatings can be electrically connected to a power source through electrical conductors extending through a sealant surrounding optically active material 22. In some examples, the transparent conductive coating forms wall surfaces of a cavity between third pane of transparent material 24 and fourth pane of transparent material 26 which optically active material 22 contacts. In other examples, one or more other coatings may overlay the transparent conductive coating 30, 32, such as a dielectric overcoat (e.g., silicon oxynitride).

For example, one or both of the panes of transparent material 24, 26 bounding the optically active material can have an alignment layer bounding and contacting optically active material 22. The alignment layer can be deposited over any underlying layers carried by the pane, such as an electrode layer, an underlying transparent dielectric blocking layer (e.g., silicone oxide), and/or transparent dielectric overcoat. The alignment layer can help reduce or eliminate Mura (blemish) defects, e.g., by changing the surface energy and/or surface interactions between optically active material 22 the surface of pane contacting the optically active material. In one example, the alignment layer is implemented by a layer containing polyimide (e.g., formed by coating the surface with a coating containing polyimide). The polyimide layer may or may not be rubbed to modify the properties of the layer and corresponding interactions with optically active layer 22.

Privacy glazing structure 12 in the example of FIG. 1 has four panes of transparent material: first pane of transparent material 14, second pane of transparent material 16, third pane of transparent material 24, and fourth pane of transparent material 26. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In the example of FIG. 1, laminate layer 28 is positioned between optically active material 22 and an exterior environment to which privacy glazing structure 12 may be exposed, e.g., with first pane of transparent material 14 in periodic contact with precipitation. In some examples, laminate layer 28 is configured to attenuate solar radiation passing through between-pane space 20 that would otherwise have a tendency to degrade optically active material 22. For example, laminate layer 28 may be configured to attenuate (e.g., block, absorb) light within the ultraviolet spectrum. The amount of light within the UV spectrum attenuated by laminate layer 28 may vary depending on the composition of the laminate layer and the thickness of the laminate layer.

In some examples, laminate layer 28 is effective to attenuate at least 25 percent of the light within the UV spectrum (e.g., from approximately 10 nm to approximately 400 nm), such as at least 30 percent, or at least 50 percent of the light within the UV spectrum impinging upon one side of the laminate layer and prevent it from passing through to the opposite side of the laminate layer. For example, the transmittance of ultraviolet light by laminate layer 28 may be characterized by its transmittance at 395 nanometers, referred to as the $T_{395}$ parameter. Laminate layer 28 may exhibit a low $T_{395}$ value, such as a value less than 75 percent, less than 55 percent, less than 40 percent, less than 30 percent, or less than 20 percent.

In different examples, laminate layer 28 may be formed of polyvinyl butyral (PVB), ethylene-vinyl acetate (EVA), thermoplastic polyurethane (TPU), a ionomer film such as SentryGlas® material available from DuPont®, or yet other suitable polymeric material. Laminate layer 28 may have a thickness ranging from 0.005 inches (0.127 mm) to 0.25 inches (6.35 mm), such as from 0.01 inches (0.254 mm) to 0.1 inches (2.54 mm), or from 0.015 inches (0.381 mm) to 0.09 inches (2.286 mm). In some examples, laminate layer 28 has a thickness greater than 0.03 inches (0.762 mm) and less than 0.1 inches (2.54 mm). In other examples, laminate layer 28 has a thickness less greater than 0.01 inches (0.254 mm) and less than 0.04 inches (1.08 mm). In some examples, laminate layer 28 may have a thickness greater than or equal to 0.015 inches (0.381 mm), such as greater than or equal to 0.03 inches (0.762 mm).

To provide adequate visual clarity through privacy glazing structure 12, laminate layer 28 may be selected to a color that is visually clear and does not exhibit a yellow hue or appearance, which can be undesirable by end consumers. In other words, laminate layer 28 may be selected to have a color neutral appearance. The color of laminate layer 28 can be characterized using well known color coordinates "a" and "b". In particular, these color coordinates are indicated herein using the superscript "*", as in a* and b*. Color properties can be determined according to the procedure specified in ASTM Method E 308.

In some examples, laminate layer 28 exhibits transmitted color characterized by a b* color coordinate value less than 5, such as less than 4.5, less than 4.0, less than 3.5, or less than 3.0. The laminate layer 28 may be selected to have a b* value sufficiently low that the laminate layer, and resulting privacy glazing structure 12, does not exhibit a yellow color or hue present in some polymeric films and undesirable by certain end consumers. Laminate layer 28 may maintain these color properties through extended service life such that the laminate layer does not undesirably change color through degradation over time. For example, laminate layer 28 exhibit the forgoing color properties after at least 5 years in service, such as at least 10 years in service, or at least 20 years in service. The service period may be measured from the manufacture date of privacy glazing structure 12.

In applications where laminate layer 28 is intended to impart impact resistance to privacy glazing structure 12, the laminate layer may have a thickness of at least 0.05 inches, such as at least 0.075 inches, or from 0.08 inches to 0.2 inches. In applications where laminate layer 28 is intended to impart safety (e.g., shatter resistance) to privacy glazing structure 12 below that which may be needed for impact resistance certification, laminate layer 28 may have a thickness less than 0.05 inches, such as from 0.01 inches to 0.04 inches, or from 0.015 inches to 0.03 inches. If privacy glazing structure 12 has a single laminate layer 28, the thickness of the layer for providing safety may range from 0.02 inches to 0.04 inches. If the privacy glazing structure 12 has multiple laminate layers, the thickness of each individual layer for providing safety may be less, such as within a range from 0.01 inches to 0.02 inches. The foregoing thickness values are examples, and the thickness of individual layers may vary depending on the application and target performance characteristics for the product.

For example, if privacy glazing structure 12 is not designed for impact resistance certification, the thickness and characteristics of laminate layer 28 may be dictated by other performance characteristics such as the optical attenuation characteristics of the layer. By contrast, if the privacy glazing structure 12 is configured for impact resistance, the structural requirements for impact resistance may provide a further design parameter for controlling material selection and/or thickness of the laminate layer 28. In some examples, the components and materials of privacy glazing structure 12 (e.g., laminate layer 28) may be configured achieve impact protection certification under ASTM E1886-13a and ASTM E1996-14a. In some such examples, the thickness of laminate layer 28 is selected to be at least 0.075 inches, such as from 0.075 inches to 0.15, or from 0.085 inches to 0.12 inches. Accordingly, a privacy glazing structure 12 according to the disclosure, including as illustrated in FIG. 1, can be compliant with ASTM E1886-13a and E1996-14a.

In some examples, the thicknesses of the panes of transparent material forming privacy glazing structure 12 are greater than the thickness of laminate layer 28. For example, the thickness of each of the panes of transparent material may range from 0.5 mm to 8 mm, such as from 1 mm to 6 mm. In some examples, the first pane of transparent material 14 has a thickness greater than at least one (and optionally all) of the panes on the opposite side of spacer 18. For example, first pane of transparent material 14 may have a thickness ranging from 2 mm to 6 mm, while second, third, and fourth panes of transparent material 16, 24, 26 may have a thickness ranging from 0.5 mm to 4 mm. In some examples, the thickness of the first pane of transparent material 14 ranges from 2.5 mm to 3.5 mm while the thicknesses of each of the second, third, and fourth panes of transparent material 16, 24, 26 range from 1.5 mm to 2.5 mm. Configuring first pane of transparent material 14 to be thicker than the remaining panes may be useful to provide additional strength and structural rigidity to privacy glazing structure 12 since the first pane of transparent material is not bonded to an immediately adjacent pane but rather faces between-pane space 20 without direct adjacent support.

When one or more of the panes of privacy glazing structure 12 are fabricated from glass, one or more of the panes (and optionally all of the panes) may be fabricated from thermally strengthened glass. One example of a thermally-strengthened glass is tempered glass. Tempered glass is generally fabricated by heating the glass unit the glass reaches a stress-relief point temperature (which may be referred to as the annealing temperature) and thereafter rapidly cooling the glass to induce compressive stresses in the surface of the glass. Tempered glass may exhibit a surface compression of greater than 10,000 pounds per square inch (psi), as determined in accordance with ASTM C1048-04. Another example of a thermally-strengthened glass is Heat Strengthened glass, which may exhibit a strength between tempered glass and annealed glass. Annealed glass is generally fabricated by heating the glass until the glass reaches a stress-relief point temperature (which may also be referred to as the annealing temperature) and thereafter slowly cooling the glass to relieve internal stresses. In some examples, Heat Strengthened glass exhibits a surface compression of approximately 5,000 psi, as determined in accordance with ASTM C1048-04.

In one example, first pane of transparent material 14 is fabricated from thermally strengthened glass (e.g., tempered, heat strengthened, annealed), while none of the other panes of privacy glazing structure 12 are fabricated from thermally strengthened glass. Thermal strengthening is beneficial to impart enhanced compression strength to the pane of transparent material. However, thermal strengthening may have a tendency to create surface deformations, such as roller wave defects and edge kinks. These surface deformations may cause the thickness of optically active material 22 to be non-uniform across the face of privacy glazing structure 12, causing optical distortions across the face of the structure. Since the first pane of transparent material 14 is not in surface contact with optically active material 22 in the example of FIG. 1 but is instead separated by between-pane space 20, surface deformations caused by thermal strengthening may not impact the distribution of optically active material 22. Utilizing one or more laminated substrates in lieu of thermally strengthened glass to bound optically active material 22 can provide sufficient strength while minimizing surface deformation impacts caused by thermal strengthening. That being said, in other examples, one or more (e.g., all) of the panes bounding optically active material 22 such as third pane 24 and fourth pane 26 may be formed of thermally strengthened glass.

In some examples, privacy glazing structure 12 includes one or more functional coatings that enhance the performance, optical characteristics, and/or reliability of the privacy glazing structure. One type of functional coating that may be included on the privacy glazing structure is a low emissivity coating. In general, a low emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. The transparent dielectric film may include one or more metal oxides, such an oxide of zinc, tin, indium, bismuth, titanium, hafnium, zirconium, and alloys and combinations thereof and/or silicon nitride and/or silicon oxynitride. Advantageous low-emissivity coatings include the LoE-180™, LoE-272™, and LoE-366™ coatings available commercially from Cardinal CG Company of Spring Green, Wis., U.S.A. Additional details on low emissivity coating structures that can be used for privacy glazing structure 12 can be found in U.S. Pat. No. 7,906,203, the entire contents of which are incorporated herein by reference.

In different examples, the low emissivity coating may include one, two, three, or more layers of infrared-reflection film separated by intervening layers of transparent dielectric film. In general, the more layers of infrared reflection film in the low emissivity coating the better the coating is able to reject undesirable wavelengths of light, such as light within the ultraviolet spectrum. In some configurations, privacy glazing structure 12 includes a low emissivity coating having at least two layers of infrared reflection film, such as two or three layers of infrared reflection film. Each layer may include at least 10 nanometers of metal (e.g., gold, silver), such as at least 20 nanometers of metal. Configuring privacy glazing structure 12 with a low emissivity coating having multiple layers of infrared reflection film may provide synergistic benefits with laminate layer 28 to attenuate light within the ultraviolet spectrum from reaching optically active material 22.

When privacy glazing structure 12 includes a low emissivity coating, the coating may be placed on any desired surface of the glazing unit. In general, the surfaces of privacy glazing structure 12 are numbered sequentially starting with a surface of the glass that is facing an external (e.g., outside environment). When privacy glazing structure 12 in the example of FIG. 1 is positioned so that the first pane of transparent material 14 is exposed to an exterior environment and the fourth pane of transparent material 16 is exposed to an interior environment, the surface of the first pane of transparent material 14 exposed to the exterior environment may be designated the #1 surface while the opposite surface of the pane facing between-pane space 20 may be designated the #2 surface. Continuing with this example, the surface of the second pane of transparent material 16 facing the between-pane space 20 may be designated the #3 surface while the opposite surface of the second pane of transparent material in contact with laminate layer 28 may be designated the #4 surface. The numbering of the pane surfaces may continue sequentially in this manner.

When a low emissivity coating is used, the low emissivity coating may be positioned on any surface of any transparent pane of privacy glazing structure 12, including on multiple surfaces of the same or different transparent panes of the insulating glass unit. In instances when privacy glazing structure 12 includes one low emissivity coating, for example, the coating may be positioned on the #1, #2, or #3 surfaces of unit. For example, FIG. 1 illustrates a low emissivity coating 50 deposited on the #2 surface of the unit, which is the surface of first pane of transparent material 14 exposed to between-pane space 20. In some examples in which privacy glazing structure 12 includes two surfaces coated with a low emissivity coating (which may be the same or different configurations), the low emissivity coatings may be positioned on the #1 and #2 surfaces, the #2 and #3 surfaces, and #1 and #3 surfaces, or any other desired combination of surfaces.

Ultraviolet radiation passing from an exterior environment into privacy glazing structure 12 may be attenuated (e.g., reflected and/or absorbed) by any layer structures and coatings positioned between the exterior environment and optically active material 22. In some examples, the materials and coatings used to fabricate privacy glazing structure 12 are selected so that privacy glazing structure 12 exhibits a $T_{395}$ less than 20 percent on optically active layer 22 from the exterior environment (and/or interior environment), such as a $T_{395}$ less than 10, a $T_{395}$ less than 5 percent, or a $T_{395}$ less than 3 percent. The $T_{395}$ properties of privacy glazing structure 12 may controlled by coordinated selection of one or more low-emissivity coatings 50 and/or one or more laminate layers 28. In the example of FIG. 1, for instance, privacy glazing structure 12 may exhibit a $T_{395}$ less than 20 percent through first pane of transparent material 14, low emissivity coating 50, second pane of transparent material 16, laminate layer 28, and third pane of transparent material 24, such as a $T_{395}$ less than 10 percent, less than 5 percent, or less than 3 percent.

Spacer 18 can be any structure that holds opposed substrates in a spaced apart relationship over the service life of privacy glazing structure 12 and seals between-pane space 20 between the opposed panes of material, e.g., so as to inhibit or eliminate gas exchange between the between-pane space and an environment surrounding the unit. One example of a spacer that can be used as spacer 18 is a tubular spacer positioned between first pane of transparent material 14 and second pane of transparent material 16. The tubular spacer may define a hollow lumen or tube which, in some examples, is filled with desiccant. The tubular spacer may have a first side surface adhered (by a first bead of sealant) to first pane of transparent material 14 and a second side surface adhered (by a second bead of sealant) to second pane of transparent material 16. A top surface of the tubular spacer can exposed to between-pane space 20 and, in some examples, includes openings that allow gas within the between-pane space to communicate with desiccating material inside of the spacer. Such a spacer can be fabricated from aluminum, stainless steel, a thermoplastic, or any other suitable material. Advantageous glazing spacers are available commercially from Allmetal, Inc. of Itasca, Ill., U.S.A.

Another example of a spacer that can be used as spacer 18 is a spacer formed from a corrugated metal reinforcing sheet surrounded by a sealant composition. The corrugated metal reinforcing sheet may be a rigid structural component that holds first pane of transparent material 14 apart from second pane of transparent material 16. Such a spacer is often referred to in commercial settings as swiggle spacer. In yet another example, spacer 18 may be formed from a foam material surrounded on all sides except a side facing a between-pane space with a metal foil. Such a spacer is commercially available from Edgetech under the trade name Super Spacer®. As another example, spacer 18 may be a thermoplastic spacer (TPS) spacer formed by positioning a primary sealant (e.g., adhesive) between first pane of transparent material 14 and second pane of transparent material 16 followed, optionally, by a secondary sealant applied around the perimeter defined between the substrates and the primary sealant. Spacer 18 can have other configurations, as will be appreciated by those of ordinary skill in the art.

To minimize thermal exchange across privacy glazing structure 12, between-pane space 20 can be filled with an insulative gas or even evacuated of gas. For example, between-pane space 20 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 20 may be evacuated so that the between-pane space is at vacuum pressure relative to the pressure of an environment surrounding privacy glazing structure 12. When between-pane space 20 is evacuated to create a vacuum environment, the glazing unit may be referred to as a vacuum privacy glazing unit.

The separation distance provided by spacer 18 between the surfaces of the first and second panes of transparent material exposed to between-pane space 20 may range from 5 mm to 20 mm, such as from 6 mm to 18 mm. In some examples, the separation distance is less than 10 mm. In other examples, the separation distances ranges from 10 mm to 20 mm. Other suitable separation distances can be used without departing from the scope of the disclosure.

While not illustrated in the example of FIG. 1, additional components may be incorporated into between-pane space 20, e.g., for aesthetic reasons. In some examples, muntin bars, which may also be referred to as glazing bars, may be included in between-pane space 20 to visually divide the privacy glazing unit into multiple panes of material.

Figure 2:
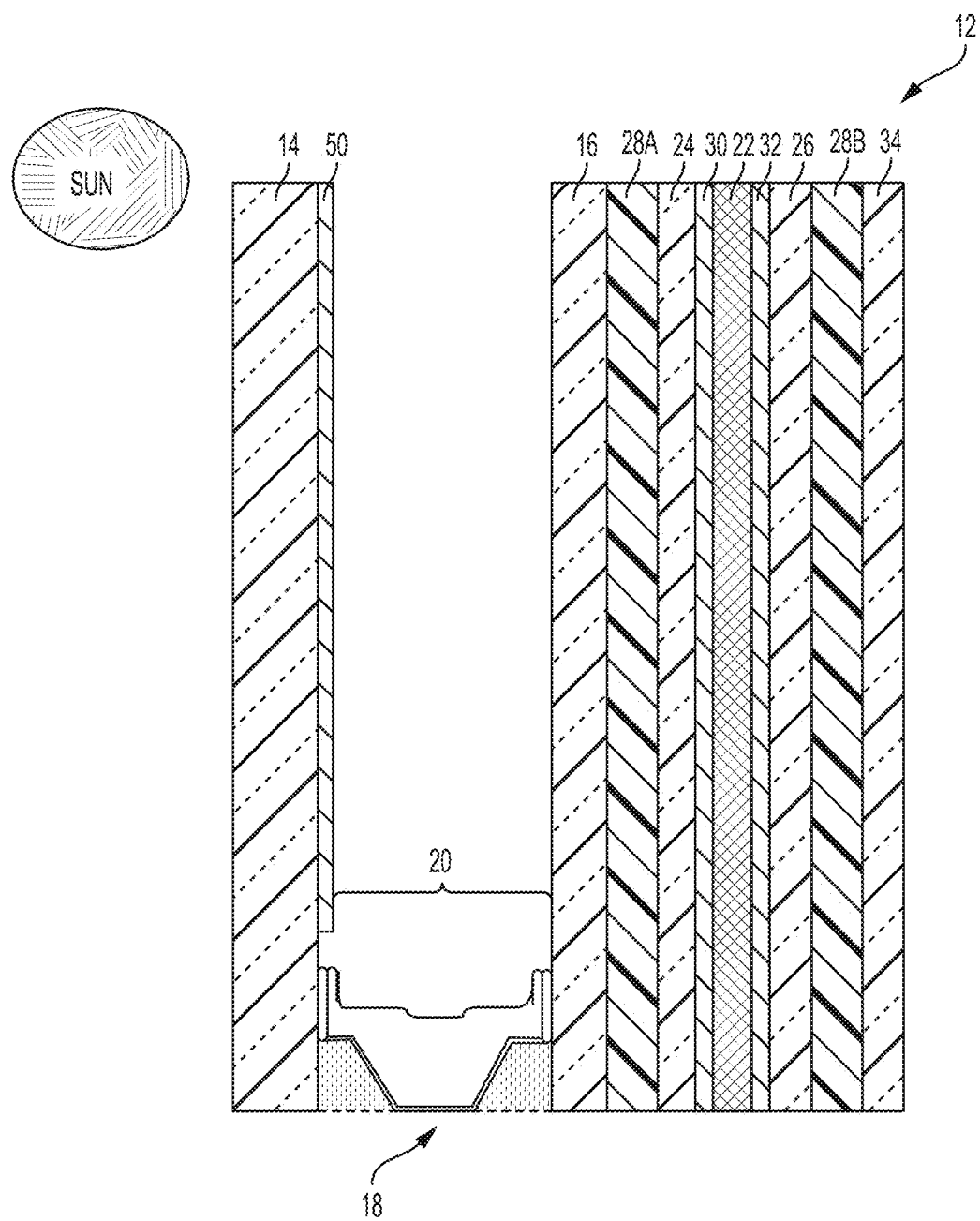
FIG. 2 is a side view illustration of another example privacy glazing structure configuration.

As mentioned above, a privacy glazing structure according to the disclosure can have a variety of different configurations. FIG. 2 is a side view illustration of another example configuration of privacy glazing structure 12 where like reference numerals refer to like elements discussed above with respect to FIG. 1. Privacy glazing structure 12 can have any of the features, layers, component thicknesses, and design elements discussed above with respect to FIG. 1.

Privacy glazing structure 12 in FIG. 2 is illustrated as having the same general layout as in FIG. 1 but further includes a fifth pane of transparent material 34 bonded to the fourth pane of transparent material 26 with a second laminate layer 28B (the first laminate layer being designated 28A in FIG. 2). The addition of the fifth pane of transparent material 34 and second laminate layer 28B may help privacy glazing structure 12 in FIG. 2 be certified as meeting safety glazing requirements. The fifth pane of transparent material 34 and second laminate layer 28B may provide additional structural rigidity and shatter resistance to the privacy glazing structure, particularly the fourth pane of transparent material 26 which may otherwise only be bonded via optically active material 22 and an edge seal. Additionally or alternatively, configuring privacy glazing structure 12 with a second laminate layer 28B on an opposite side of optically active material 22 from first laminate layer 28A may block UV light coming from that opposite side that may otherwise have a tendency to degrade optically active material 22.

Fifth pane of transparent material 34 may be constructed of those materials discussed above as being suitable for the first, second, third, and fourth panes of transparent material and may also fall within the example thickness ranges described for those panes. Similarly, second laminate layer 28B may be constructed of those materials discussed above as being suitable for laminate layer 28 (which is implemented as first laminate layer 28A in FIG. 2). Second laminate layer 28B may fall within the example thickness ranges and exhibit optical properties as described for laminate layer 28 with respect to FIG. 1.

In different examples in which optically active material 22 is bonded between two laminated substrates as illustrated in FIG. 2, the laminated substrates may be the same or may be different. For example, second pane of transparent material 16 and third pane of transparent material 24 may be the same material and/or have the same thickness as fourth pane of transparent material 26 and fifth pane of transparent material 34 or may be formed of different materials and/or thickness. Additionally, first laminate layer 28A may be the same material and/or thickness as second laminate layer 28B or may be formed of a different material and/or have a different thickness.

In one example in which optically active material is bonded between two laminated substrates as illustrated in FIG. 2, the first laminate layer 28A and the second laminate layer 28B have asymmetrical thicknesses. The laminate layer positioned closest to the exterior environment (e.g., #1) surface—which is first laminate layer 28A in FIG. 2—may be thicker than the laminate layer positioned closer to the interior environment, which is second laminate layer 28B in FIG. 2. This asymmetrical arrangement may useful to position the thicker layer providing greater UV attenuation characteristics than the thinner layer closer to the exterior environment where the strongest UV radiation from the sun enter privacy glazing structure 12. By providing a thinner laminate layer on the opposite side of optically active material 22 closest to the interior environment the thickness and weight of privacy glazing structure 12 can be reduced as compared to if a thicker second laminate layer were used. However, the second laminate layer 28B may also be sufficiently thick to suitably attenuate UV light emanating from an interior environment.

In some examples, first laminate layer 28A defines a first thickness, second laminate layer 28B defines a second thickness, and the first thickness is different than the second thickness. For example, a ratio of the first thickness divided by the second thickness may range from 1.2 to 15, such as from 1.5 to 10, or from 2 to 10. For example, a ratio of the thickness of first laminate layer 28A to second laminate layer 28B may range from 1.5 to 3. While the specific thicknesses of the first laminate layer 28A and the second laminate layer 28B may vary, in some examples, the first laminate layer 28A has a thickness range from 0.015 inches to 0.125 inches, such as from 0.025 inches to 0.1 inch and the second laminate layer 28B has a thickness ranging from 0.001 inches to 0.05 inches, such as from 0.05 inches to 0.02 inches. For example, the first laminate layer 28A may have a thickness ranging from 0.02 inches to 0.04 inches and the second laminate layer 28B may have a thickness ranging from 0.01 inches to 0.02 inches.

The amount of UV radiation attenuated by first laminate layer 28A and second laminate layer 28B can vary depending on the types of materials used for each laminate layer and the thickness of each layer. In some examples, first laminate layer 28A exhibits a $T_{395}$ less than 60 percent while second laminate layer 28B exhibits a $T_{395}$ greater than that of first laminate layer 28A but less than 90 percent. For example, first laminate layer 28A may exhibit a $T_{395}$ ranging from 60 percent to 10 percent, while second laminate layer 28B may exhibit a $T_{395}$ ranging from 80 percent to 60 percent.

While the thicknesses of the panes of transparent material forming privacy glazing structure 12 can vary as discussed above, in some configurations, the thicknesses of the first pane of transparent material 14 is greater than the thickness of each of the second, third, fourth, and fifth panes of transparent material 16, 24, 26, 34. For example, first pane of transparent material 14 may have a thickness ranging from 2 mm to 6 mm, while second, third, fourth, and fifth panes of transparent material 16, 24, 26, 34 may have a thickness ranging from 0.5 mm to 4 mm. In some examples, the thickness of the first pane of transparent material 14 ranges from 2.5 mm to 5 mm, such as from 2.5 mm to 3.5 mm (e.g., 3 mm). The thicknesses of each of the second, third, fourth, and fifth panes of transparent material 16, 24, 26 may range from 1.5 mm to 2.5 mm (e.g., 2 mm) or may have different thickness ranges, such as from 1.8 mm to 3.5 mm, or from 2 mm to 3 mm.

As noted above, the addition of the fifth pane of transparent material 34 and second laminate layer 28B may help privacy glazing structure 12 in FIG. 2 be certified as meeting safety glazing requirements. For example, the components and materials of privacy glazing structure 12 may be configured achieve safety compliance under US Consumer Product Safety Commission (CPSC) regulatory guidelines 16 C.F.R. § 1201 Category I and II and/or American National Standards Institute (ANSI) Z97.1.2015. In general, these standards have the following requirements and criteria:

|  | ANSI Z-97.1-2015 | CPSC 16 CFR 1201 I | CPSC 16 CFR 1201 II |
|---|---|---|---|
| Use of Standard | To test and identify glasses as safety glazing materials which will be used in locations where required in building codes. Monolithic annealed glass in any thickness, is not considered a safety glazing material under this standard. | To test and identify glasses as safety glazing materials which will be used in any location that is subject to human impact resistance requirements (limited to products having an area not greater than 9 sq. ft.) | To test and identify glasses as safety glazing materials which will be used in any location that is subject to human impact resistance requirements (unlimited size) |
| Impact Test Requirements | Class A: 100# bag dropped from height of 48 inches<br>Class B: 100# bag dropped from height of 18 inches | 100# bag dropped from height of 18 inches | 100# bag dropped from height of 48 inches |
| Evaluation Criteria for Tempered Glass to Pass Standard | a. No fracture at specified Class drop height or,<br>b. If fracture occurs at the specified Class drop height, the ten largest crack free particles shall not weigh more than 10 square inches of the glass tested | a. The ten largest crack free particles shall not weigh more than 10 square inches of the glass tested<br>b. If no fracture occurs from impact test, the glass is to be broken using center punch test. | a. The ten largest crack free particles shall not weigh more than 10 square inches of the glass tested.<br>b. If no fracture occurs from impact test, the glass is to be broken using center punch test. |
| Evaluation Criteria for Laminated Glass to Pass Standard | a. No fracture at specified Class drop height or,<br>b. If fracture occurs at the specified Class height, no hole through which a 3 inch diameter sphere will freely pass is allowed | a. No fracture at 18 inches or,<br>b. If fracture occurs at specified Category height, no hole through which a 3 inch diameter sphere will freely pass is allowed.<br>c. If particles are detached | a. No fracture at 48 inches or,<br>b. If fracture occurs at specified Category height, no hole through which a 3 inch diameter sphere will freely pass is allowed.<br>c. If particles are detached |

| ANSI Z-97.1-2015 | CPSC 16 CFR 1201 I | CPSC 16 CFR 1201 II |
|---|---|---|
| | from the test specimen, they cannot weight more that the equivalent mass for 15.5 in².<br>d. The single largest detached particle cannot weigh more than the equivalent mass for 6.82 in². | from the test specimen, they cannot weight more that the equivalent mass for 15.5 in².<br>d. The single largest detached particle cannot weigh more than the equivalent mass for 6.82 in². |

A privacy glazing structure 12 according to the disclosure, including as illustrated in FIG. 2, can be compliant with CPSC 16 C.F.R. § 1201 Category I and II and/or ANSI Z97.1.2015. In some configurations, the privacy glazing structure 12 is complaint with impact protection certification in addition to being safety compliant according to the example safety compliance standards outlined above. For example, the privacy glazing structure 12 may also be compliant with ASTM E1886-13a and ASTM E1996-14a. To achieve further compliance with ASTM E1886-13a and ASTM E1996-14a, the thickness of first laminate layer 28A and/or second laminate layer 28B may be increased as compared to the thickness used to achieve safety compliance but not impact compliance.

In some such examples, the thickness of first laminate layer 28A and/or second laminate layer 28B is selected to be at least 0.075 inches, such as from 0.075 inches to 0.15, or from 0.085 inches to 0.12 inches. The other laminate layer may have the same thickness or a different thickness. For example first laminate layer 28A may have a thickness falling within any one of the foregoing ranges while second laminate layer 28B may have a thickness ranging from ranging from 0.001 inches to 0.05 inches, such as from 0.05 inches to 0.02 inches.

In configurations in which one or more of the panes of transparent material forming privacy glazing structure 12 are fabricated from glass, first pane of transparent material 14 may be tempered glass to enhance the impact resistance of the privacy glazing structure. The remaining panes of transparent material in the privacy glazing structure may or may not be fabricated from tempered glass. Additionally or alternatively, first pane of transparent material 14 may be laminated to provide a laminated substrate on an opposite side of spacer 18 from the side containing optically active material 22. When utilizing a laminated substrate on the opposite side of spacer 18, first pane of transparent material 14 may not be tempered and yet the privacy glazing structure may still achieve impact protection certification.

Figure 3:
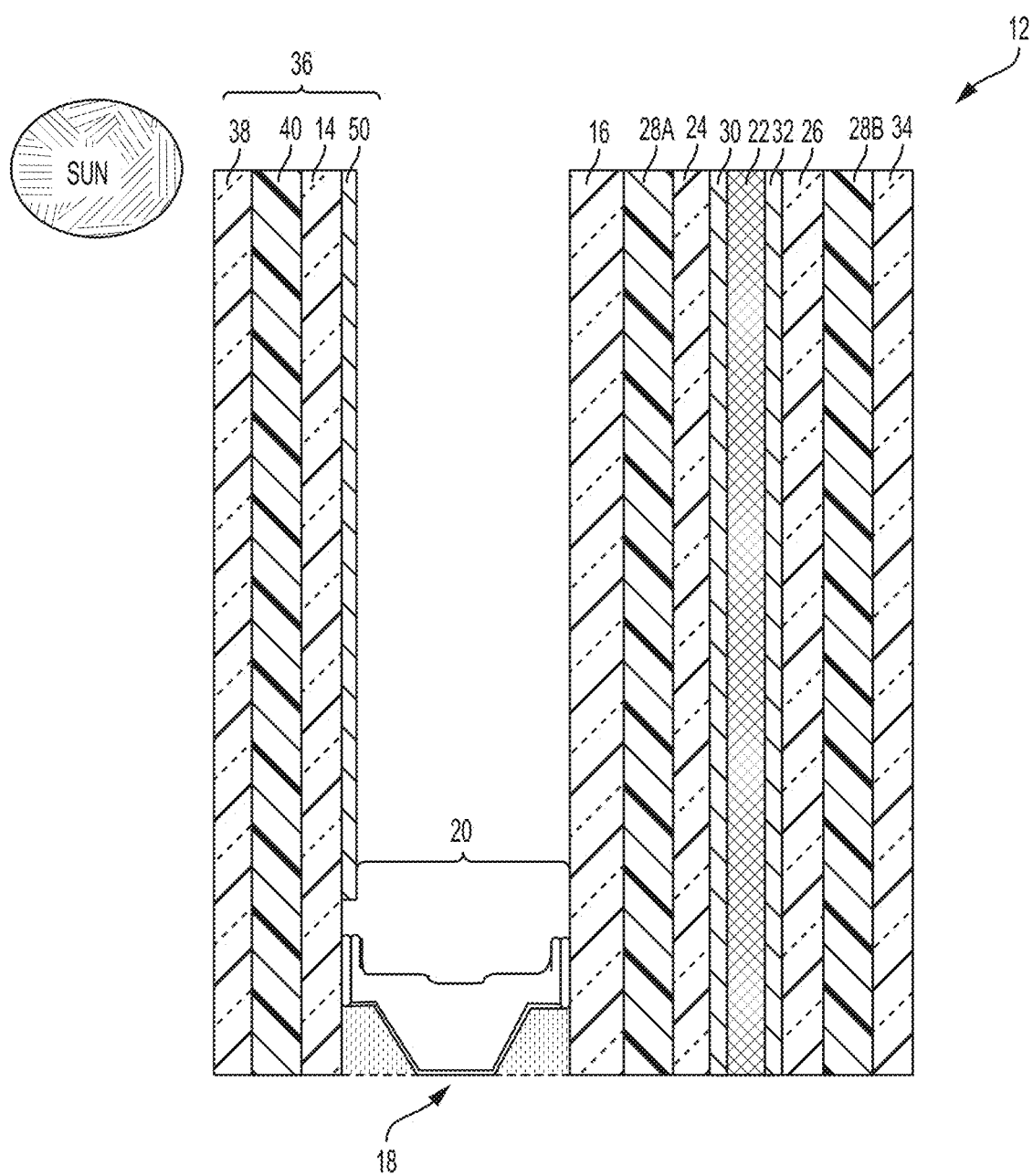
FIG. 3 is a side view illustration of another example privacy glazing structure configuration.

FIG. 3 is side view illustration of an example configuration of privacy glazing structure 12 from FIG. 2 in which first pane of transparent material 14 in part of a laminated substrate 36 that includes an additional pane of transparent material 38 bonded thereto with an additional laminate layer 40. The additional pane of transparent material 38 may be constructed of those materials discussed above as being suitable for the first, second, third, and fourth panes of transparent material and may also fall within the example thickness ranges described for those panes. Similarly, the additional laminate layer 40 may be constructed of those materials discussed above as being suitable for laminate layer 28 and may fall within the example thickness ranges and exhibit optical properties as described for laminate layer 28 with respect to FIG. 1. In some examples, the first pane of transparent material 14 and the additional pane of transparent material 38 each have a thickness ranging from 2.5 mm to 3.5 mm (e.g., 3 mm). The additional laminate layer 40 may have a thickness of at least 0.075 inches, such as from 0.075 inches to 0.15, or from 0.085 inches to 0.12 inches. Such a privacy glazing structure 12 may be compliant with safety and/or impact protection standards as discussed above.

In the example of FIGS. 1-3, privacy glazing structure 12 is shown oriented so first pane of transparent material 14 is on a side of spacer 18 exposed to an outdoor environment and optically active material 22 is on an opposite side of the spacer exposed to an indoor environment. In different applications, both sizes if the privacy glazing structure may be exposed to an indoor environment (e.g., when used as an interior partition). Alternatively, the side of the structure carrying the first pane of transparent material 14 may be exposed to an interior environment while the side of structure containing optically active material 22 may be exposed to an exterior environment.

Figure 4:
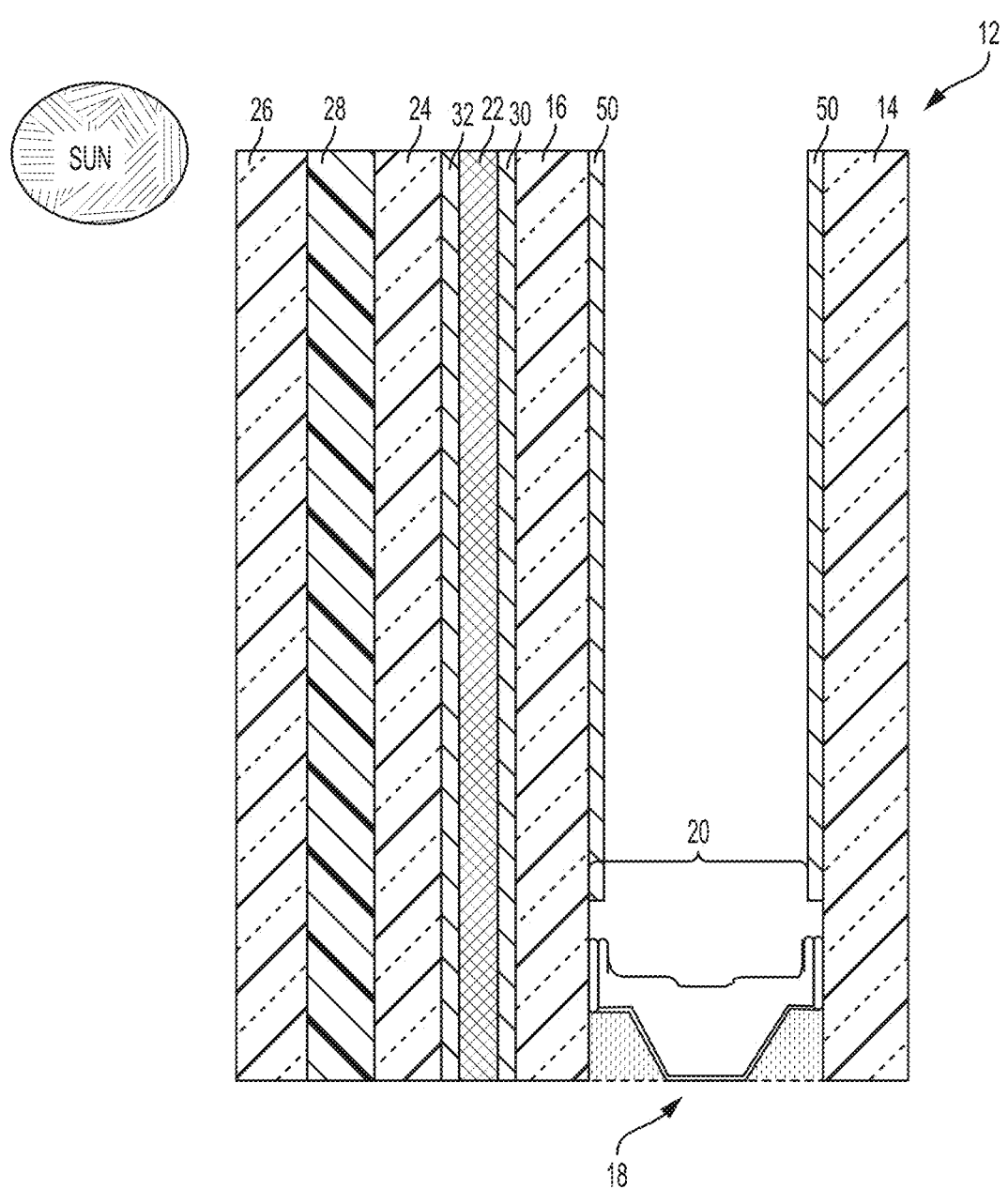
FIG. 4 is a side view illustration of another example privacy glazing structure configuration.

FIG. 4 is a side view illustration of an example configuration of privacy glazing structure 12 from FIG. 1 in which first pane of transparent material 14 is exposed to an interior environment (e.g., temperature controlled environment) and the opposite size of the privacy glazing unit carrying optically active material 22 is exposed to an exterior environment, e.g., in periodic contact with moisture. Privacy glazing structure 12 in FIG. 4 can have any of the features, layers, component thicknesses, and design elements discussed above with respect to FIGS. 1 and 2.

For example, while the thicknesses of the panes of transparent material forming privacy glazing structure 12 in FIG. 4 can vary, in some configurations, the fourth pane of transparent material 26 and/or the thicknesses of the first pane of transparent material 14 is greater than the thickness of each of the second and third panes of transparent material 16, 24. For example, the fourth pane of transparent material 26 and/or the first pane of transparent material 14 may have a thickness ranging from 2 mm to 6 mm, while second and third panes of transparent material 16, 24 may have a thickness ranging from 0.5 mm to 4 mm. In some examples, the thickness of the fourth pane of transparent material 26 and/or the first pane of transparent material 14 ranges from 2.5 mm to 3.5 mm (e.g., 3 mm) while the thicknesses of the second and third panes of transparent material 16, 24 range from 1.5 mm to 2.5 mm (e.g., 2 mm). The first pane of transparent material 14 may have a thickness ranging from 2.5 mm to 3.5 mm (e.g., 3 mm) or from 1.5 mm to 2.5 mm (e.g., 2 mm), depending on the configuration.

The thickness of laminate layer 28 in the example of FIG. 4 may fall within the ranges discussed above in connection with FIG. 1. In some examples, laminate layer 28 may have a thickness of at least 0.075 inches, such as from 0.075 inches to 0.15, or from 0.085 inches to 0.12 inches. Such a laminate thickness may help configure the privacy glazing structure to be certified for impact protection.

Figure 5:
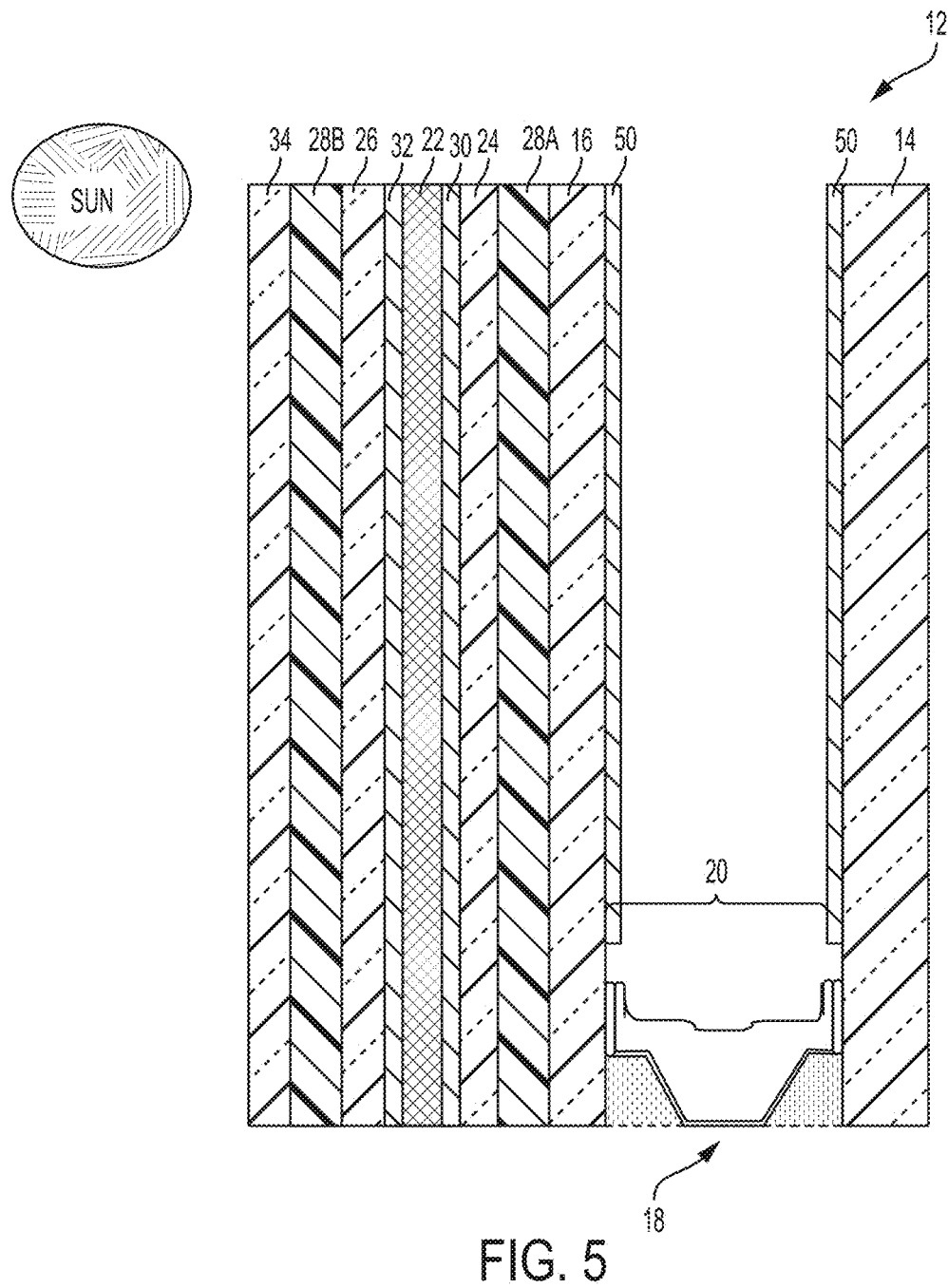
FIG. 5 is a side view illustration of another example privacy glazing structure configuration.

FIG. 5 is a side view illustration of an example configuration of privacy glazing structure 12 from FIG. 2 in which first pane of transparent material 14 is exposed to an interior environment (e.g., temperature controlled environment) and the opposite size of the privacy glazing unit carrying optically active material 22 is exposed to an exterior environment, e.g., in periodic contact with moisture. Privacy glazing structure 12 in FIG. 5 can have any of the features, layers, component thicknesses, and design elements discussed above with respect to FIGS. 1 and 2.

For example, while the thicknesses of the panes of transparent material forming privacy glazing structure 12 in FIG. 5 can vary, in some configurations, the fifth pane of transparent material 34 and/or the thicknesses of the first pane of transparent material 14 is greater than the thickness of each of the second, third, and fourth panes of transparent material 16, 24, 26. For example, the fifth pane of transparent material 34 and/or the first pane of transparent material 14 may have a thickness ranging from 2 mm to 6 mm, while second, third, and fourth panes of transparent material 16, 24, 26 may have a thickness ranging from 0.5 mm to 4 mm. In some examples, the thickness of the fifth pane of transparent material 34 and/or the first pane of transparent material 14 ranges from 2.5 mm to 4.5 mm, or from 2.5 mm to 3.5 mm (e.g., 3 mm) while the thicknesses of the second, third, and fourth panes of transparent material 16, 24, 26 may range from 1.5 mm to 2.5 mm (e.g., 2 mm), or from 1.8 mm to 3.9 mm, or from 2.2 mm to 3.9 mm, or from 2.2 mm to 3.0 mm. The first pane of transparent material 14 may have a thickness ranging from 2.5 mm to 3.5 mm (e.g., 3 mm) or from 1.5 mm to 2.5 mm (e.g., 2 mm), depending on the configuration.

The thickness of laminate layers 28A and 28B in the example of FIG. 5 may fall within the ranges discussed above in connection with FIG. 1. However, because laminate layer 28B is closer to the exterior environment than laminate layer 28A in the configuration of FIG. 5, laminate layer 28B may have the configurations and thickness described as being suitable for the outermost laminate layer above (which is laminate layer 28A in FIG. 2). By contrast, laminate layer 28A may have the configurations and thickness described as being suitable for the innermost laminate layer above (which is laminate layer 28B in FIG. 2).

Figure 6:
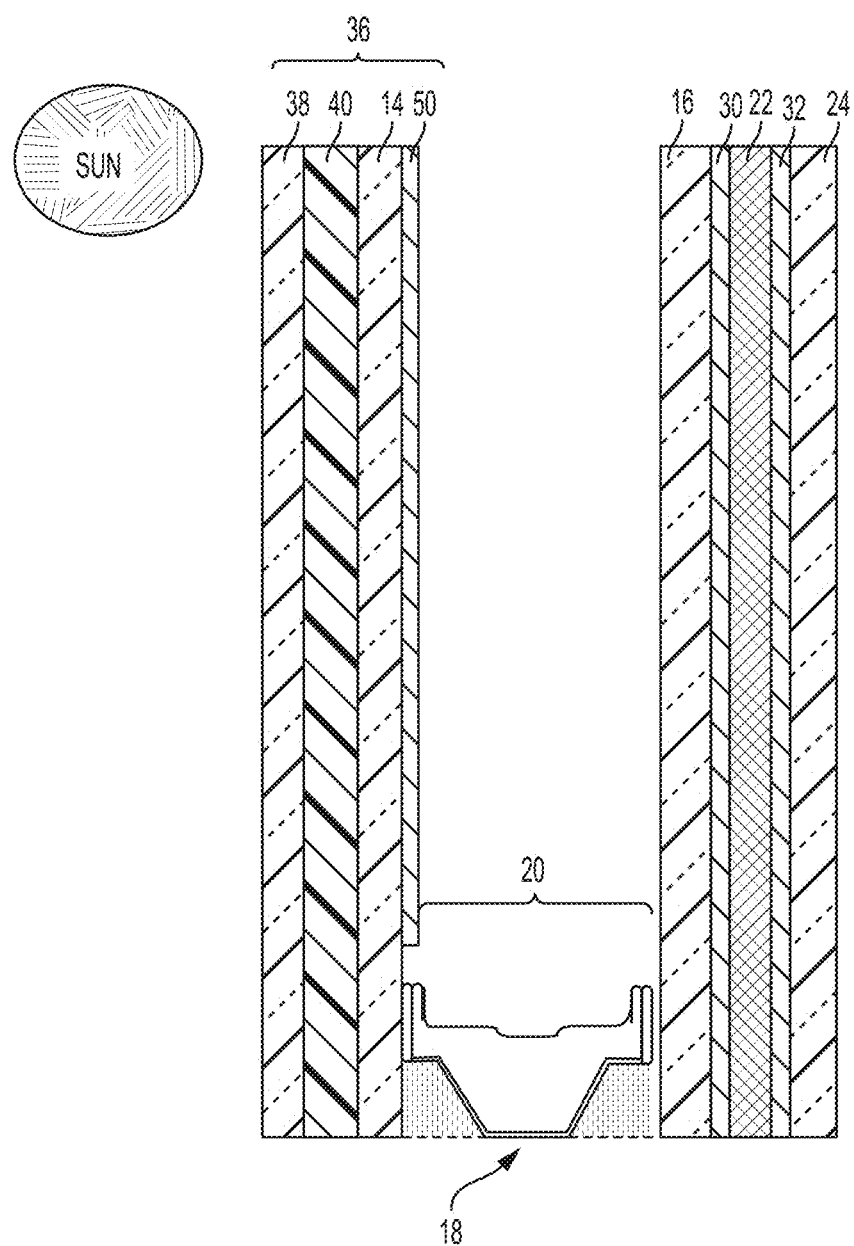
FIG. 6 is a side view illustration of another example privacy glazing structure configuration.

FIG. 6 is a side view illustration of another example configuration of privacy glazing structure 12 where like reference numerals refer to like elements discussed above with respect to FIG. 1. Privacy glazing structure 12 can have any of the features, layers, component thicknesses, and design elements discussed above with respect to FIG. 1.

Privacy glazing structure 12 in FIG. 6 is illustrated as having the same general layout as in FIG. 1 but there is no fourth pane of transparent material 34 bonded to second pane of transparent material 24 with laminate layer 28. Instead, optically actively material 22 is positioned between second pane of transparent material 16 and third pane of transparent material 24, e.g., with an edge seal extending around the perimeter of the resulting assembly.

Additionally, in the example if FIG. 6, first pane of transparent material 14 in part of a laminated substrate 36 that includes an additional pane of transparent material 38 bonded thereto with a laminate layer 40, as discussed above with respect to FIG. 3. The pane of transparent material 38 may be constructed of those materials discussed above as being suitable for the first, second, and third panes of transparent material and may also fall within the example thickness ranges described for those panes. Similarly, the laminate layer 40 may be constructed of those materials discussed above as being suitable for laminate layer 28 and may fall within the example thickness ranges and exhibit optical properties as described for laminate layer 28 with respect to FIG. 1. In some examples, the first pane of transparent material 14 and the pane of transparent material 38 each have a thickness ranging from 2.5 mm to 3.5 mm (e.g., 3 mm). The laminate layer 40 may have a thickness of at least 0.075 inches, such as from 0.075 inches to 0.15, or from 0.085 inches to 0.12 inches. Such a privacy glazing structure 12 may be compliant with safety and/or impact protection standards as discussed above.

The following examples may provide additional details about privacy glazing structures in accordance with this disclosure.

EXAMPLES

Figure 7:
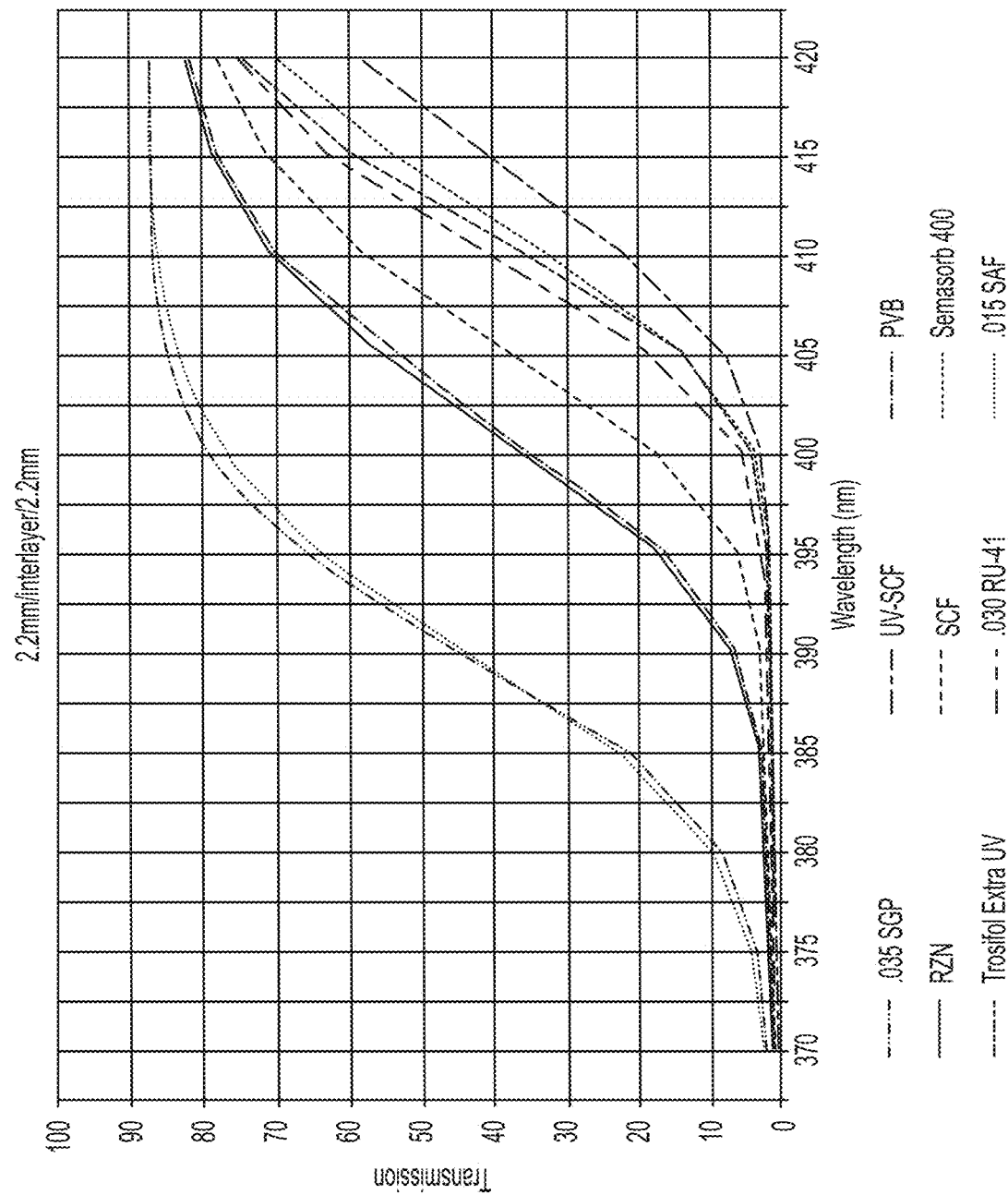
FIG. 7 is a plot of light transmittance as a function of wavelength for different example laminate materials incorporated into laminate substrates.

Different commercially-available laminate materials were used to fabricate laminate substrates each composed of 2.2 mm soda-lime-silicate float glass panes bonded each select laminate material. The optical transmission characteristics of the resultant substrates were subsequently analyzed to understand how the different laminate materials would shield an underlying optically active material from certain wavelengths of light, particularly within the ultraviolet spectrum. The results of the testing are shown in FIG. 7 and indicate that certain laminate materials attenuate significantly more light, particularly within the UV near visible light spectrum than other laminate materials.

Figure 8:
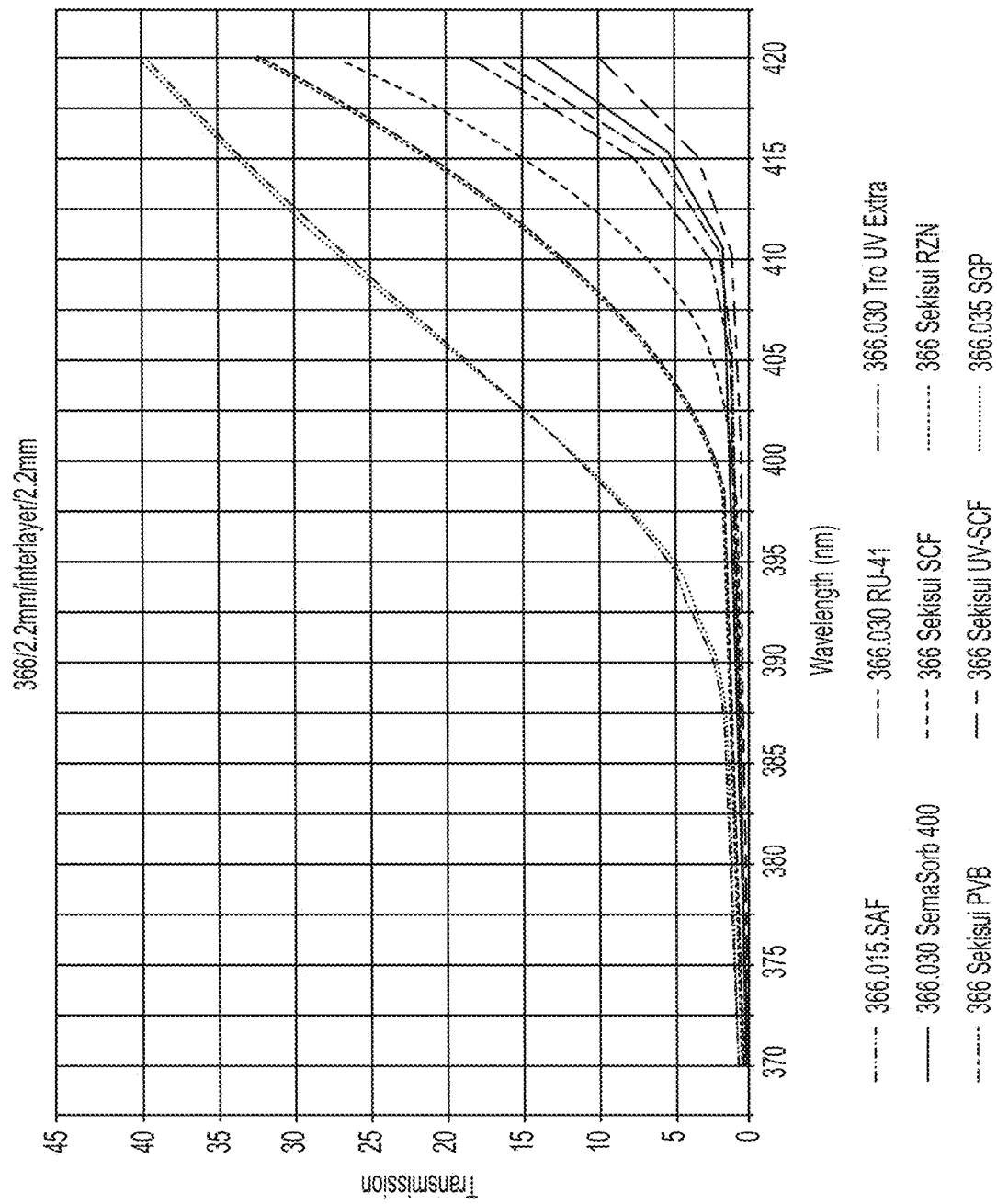
FIG. 8 is a plot of light transmittance as a function of wavelength for different example laminate materials incorporated into laminate substrates that further include a low-emissivity coating.

The laminate substrates formed as discussed above were further coated with a low-emissivity coating to understand how the combination of specific laminate materials and a low-emissivity coating can work synergistically to better shield an underlying optically active material from certain wavelengths of light, particularly within the ultraviolet spectrum. The particular coating used with a LoE 366™ low-emissivity coatings available commercially from Cardinal CG Company of Spring Green, Wis., U.S.A. The results of the testing are shown in FIG. 8 and indicate that the combination of certain laminate materials with a suitable low-emissivity coating was able to attenuate substantially all light within the UV spectrum, particularly within the UV near visible light spectrum, potentially offering enhanced protection to an underlying optically active layer susceptible to UV degradation.

The invention claimed is:

1. A privacy glazing structure comprising:
a first pane of transparent material;
a second pane of transparent material that is generally parallel to the first pane of transparent material;
a spacer positioned between the first pane of transparent material and the second pane of transparent material to define a between-pane space, the spacer sealing the between-pane space from gas exchange with a surrounding environment and holding the first pane of transparent material a separation distance from the second pane of transparent material;
a third pane of transparent material that is generally parallel to the first pane of transparent material and the second pane of transparent material;
a fourth pane of transparent material that is generally parallel to the third pane of transparent material;
an electrically controllable optically active material positioned between the third pane of transparent material and the fourth pane of transparent material;
a first electrically conductive layer deposited over the third pane of transparent material and a second electrically conductive layer deposited over the fourth pane of transparent material, the first electrically conductive layer and the second electrically conductive layer being arranged to electrically control the electrically controllable optically active material;

a laminate layer bonding the second pane of transparent material to the third pane of transparent material, the laminate layer providing a barrier to ultraviolet light that would otherwise impinge upon the electrically controllable optically active material;

a low-emissivity coating on an interior surface of at least one of the first pane of transparent material and the second pane of transparent material facing the between-pane space.

2. The structure of claim 1, wherein the laminate layer exhibits a T395 less than 75 percent.

3. The structure of claim 1, wherein the laminate layer exhibits a T395 less than 55 percent.

4. The structure of claim 1, wherein the first pane of transparent material is tempered glass, and the second, third, and fourth panes of transparent material are each formed of glass that is not thermally strengthened.

5. The structure of claim 1, wherein the laminate layer comprises polyvinyl butyral having a thickness ranging from 0.010 inches (0.254 mm) to 0.1 inches (2.54 mm).

6. The structure of claim 1, wherein the low-emissivity coating comprises one or more layers of infrared-reflection film interposed between one or more layers of transparent dielectric film.

7. The structure of claim 6, wherein the low-emissivity coating comprises two or three layers comprising silver.

8. The structure of claim 1, wherein the structure exhibits a T395 less than 5 percent through a combination of the first pane of transparent material, the second pane of transparent material, the third pane of transparent material, the laminate layer, and the low-emissivity coating.

9. The structure of claim 1, wherein the first pane of transparent material forms a #1 surface of the structure configured to face an exterior environment and the low-emissivity coating is on the interior surface of the first pane of transparent material.

10. The structure of claim 1, wherein at least one of the first pane of transparent material, the second pane of transparent material, and the third pane of transparent material have a thickness greater than a thickness of the fourth pane of transparent material.

11. The structure of claim 10, wherein the first pane of transparent material has a thickness greater than a thickness of each of the second pane of transparent material, the third pane of transparent material, and the fourth pane of transparent material.

12. The structure of claim 1, further comprising a fifth pane of transparent material, wherein the laminate layer comprises a first laminate layer, and further comprising a second laminate layer, wherein the second laminate layer bonds the fourth pane of transparent material to the fifth pane of transparent material.

13. The structure of claim 12, wherein the first laminate layer defines a first thickness, the second laminate layer defines a second thickness, and the first thickness is different than the second thickness.

14. The structure of claim 13, wherein a ratio of the first thickness divided by the second thickness ranges from ranges from 2 to 10.

15. The structure of claim 13, wherein first thickness ranges from 0.025 inches (0.635 mm) to 0.1 inch (2.54 mm) and the second thickness ranges from 0.005 inches (0.127 mm) to 0.02 inches (5.08 mm).

16. The structure of claim 12, wherein the first laminate and the second laminate are each formed of a same material.

17. The structure of claim 1, wherein the structure comprises, in sequential order:
the first pane of transparent material;
the low-emissivity coating deposited on the interior surface of the first pane of transparent material;
the between-pane space;
the second pane of transparent material;
the laminate layer;
the third pane of transparent material;
the first electrically conductive layer deposited on the third pane of transparent material;
the electrically controllable optically active material;
the second electrically conductive layer deposited on the fourth pane of transparent material; and
the fourth pane of transparent material.

18. The structure of claim 1, wherein the separation distance defined by the spacer ranges from 5 mm to 20 mm.

19. The structure of claim 1, wherein each pane of transparent material in the structure is formed of glass.

20. The structure of claim 1, wherein the spacer comprises a tubular spacer.

21. The structure of claim 1, wherein the electrically controllable optically active material is a liquid crystal material having a light transmittance that varies in response to application of an electrical field.

22. The structure of claim 1, wherein the electrically controllable optically active material is selected from the group consisting of an electrochromic material and a suspended particle material.

23. A privacy glazing structure comprising:
a first pane of glass;
a second pane of glass that is generally parallel to the first pane of glass;
a spacer positioned between the first pane of glass and the second pane of glass to define a between-pane space, the spacer sealing the between-pane space from gas exchange with a surrounding environment and holding the first pane of glass a separation distance from the second pane of glass;
a third pane of glass that is generally parallel to the first pane of glass and the second pane of glass;
a fourth pane of glass that is generally parallel to the third pane of glass;
a liquid crystal material having a light transmittance that varies in response to application of an electrical field positioned between the third pane of glass and the fourth pane of glass;
a first electrically conductive layer deposited over the third pane of glass and a second electrically conductive layer deposited over the fourth pane of glass, the first electrically conductive layer and the second electrically conductive layer being arranged to electrically control the liquid crystal material;
a first laminate layer bonding the second pane of glass to the third pane of glass,
a fifth pane of glass that is generally parallel to the fourth pane of glass;
a second laminate layer bonding the fourth pane of glass to the fifth pane of glass,
wherein the first pane of glass is tempered glass, and the second, third, fourth, and fifth panes of glass are each formed of glass that is not thermally strengthened.

24. The structure of claim 23, wherein the first laminate layer has a thickness of at least 0.7 mm and the second laminate layer has a thickness of at least 0.35 mm.

25. The structure of claim 24, wherein the second laminate layer is thinner than the first laminate layer.

26. The structure of claim 23, further comprising a low-emissivity coating on an interior surface of at least one of the first pane of transparent material and the second pane of transparent material facing the between-pane space.

27. The structure of claim 23, wherein the first pane of glass has a thickness ranging from 2.5 mm to 5 mm, the second pane of glass has a thickness ranging from 2.2 mm to 3.9 mm, the first laminate layer has a thickness ranging from 0.75 mm to 2.3 mm, the third pane of glass has a thickness ranging from 1.8 mm to 3.9 mm, the fourth pane of glass has a thickness ranging from 1.8 mm to 3.9 mm, the second laminate layer has a thickness ranging from 0.375 mm to 0.75 mm and the fifth pane of glass has a thickness ranging from 2.0 mm to 3.0 mm.

28. The structure of claim 23, wherein the structure comprises, in sequential order:

the first pane of glass;
the between-pane space;
the second pane of glass;
the first laminate layer;
the third pane of glass;
the first electrically conductive layer deposited on the third pane of transparent material;
the liquid crystal material;
the second electrically conductive layer deposited on the fourth pane of transparent material;
the fourth pane of glass;
the second laminate layer; and
the fifth pane of glass.

29. The structure of claim 28, further comprising a low-emissivity coating deposited on an interior surface of the first pane of glass facing the between-pane space.

30. The structure of claim 23, wherein the first laminate layer and the second laminate layer each comprise polyvinyl butyral.

* * * * *